United States Patent
Hattori et al.

(10) Patent No.: US 11,668,892 B2
(45) Date of Patent: Jun. 6, 2023

(54) ALIGNMENT DEVICE AND OPTICAL DEVICE

(71) Applicant: Hitachi High-Tech Corporation, Tokyo (JP)

(72) Inventors: Yuto Hattori, Tokyo (JP); Nobuhiko Kanzaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 218 days.

(21) Appl. No.: 17/246,875

(22) Filed: May 3, 2021

(65) Prior Publication Data

US 2021/0389543 A1    Dec. 16, 2021

(30) Foreign Application Priority Data

Jun. 16, 2020  (JP) .............................. JP2020-103538

(51) Int. Cl.
    *G02B 7/00*   (2021.01)
(52) U.S. Cl.
    CPC .................................. *G02B 7/003* (2013.01)
(58) Field of Classification Search
    CPC ...... G02B 7/003; G02B 7/1822; G02B 7/023; G02B 21/0016; G02B 21/02; H01L 22/12
    See application file for complete search history.

(56) References Cited

U.S. PATENT DOCUMENTS

| | | | |
|---|---|---|---|
| 5,822,133 A | 10/1998 | Mizuno et al. | |
| 10,642,164 B2 | 5/2020 | Otani et al. | |

FOREIGN PATENT DOCUMENTS

| | | |
|---|---|---|
| JP | 9-106944 A | 4/1997 |
| JP | 2018-54303 A | 4/2018 |

*Primary Examiner* — Robert E. Tallman
(74) *Attorney, Agent, or Firm* — Crowell & Moring LLP

(57) ABSTRACT

To improve alignment accuracy of an optical element. An alignment device includes an optical element, a base portion that holds the optical element and is supported in a state movable in an X-direction and a Y-direction intersecting with the X-direction, a mechanical driving unit driven by a pressure of a fluid, a member in contact with the base portion pushed by the mechanical driving unit, a stage portion that holds the member and is supported in a state movable in the Y-direction, the mechanical driving unit driven by a pressure of a fluid, and a member in contact with the stage portion pushed by the mechanical driving unit. The optical element has a position: adjusted by a balance between the pushing force by the mechanical driving unit and an elastomeric force in which at least one of the base portion and the member elastically deforms in the X-direction; and adjusted by a balance between the pushing force by the mechanical driving unit and an elastomeric force in which at least one of the stage portion and the member elastically deforms in the Y-direction.

15 Claims, 10 Drawing Sheets

FIG. 4
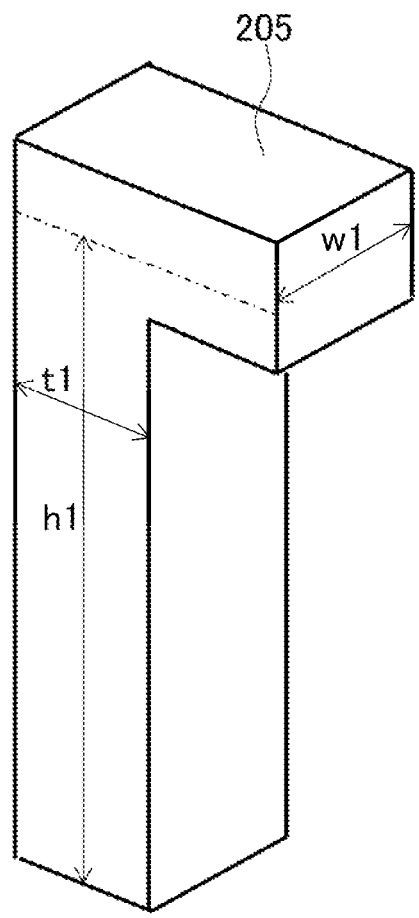
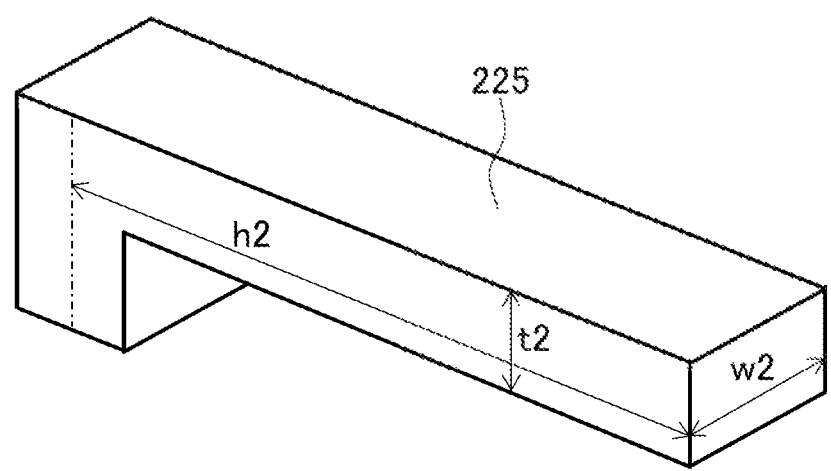

ALIGNMENT DEVICE AND OPTICAL DEVICE

TECHNICAL FIELD

The present invention relates to an alignment device and an optical device using the same.

BACKGROUND ART

Japanese Unexamined Patent Application Publication No. 9-106944 (Patent Literature 1) describes a device that uses a leaf spring in a projection optical system of an exposure device to control a position of a lens in an optical axis direction. Japanese Unexamined Patent Application Publication No. 2018-54303 (Patent Literature 2) describes a defect observation device that optically observes a defect in a pattern arised on a semiconductor wafer.

CITATION LIST

Patent Literature

Patent Literature 1: Japanese Unexamined Patent Application Publication No. 9-106944
Patent Literature 2: Japanese Unexamined Patent Application Publication No. 2018-54303

SUMMARY OF INVENTION

Technical Problem

An optical device is used for various kinds of applications, for example, observation of an object, defect inspection, or the like. For example, the optical device irradiates an observation target with light by an illumination optical system, and observes one or both of reflected light and scattered light from the observation target by a detection optical system. The illumination optical system and the detection optical system use optical elements, such as a lens, a mirror, or an optical filter. To improve accuracy of the observation by the optical device, an appropriate optical element needs to be selected. To improve the accuracy of observation by the optical device, alignment accuracy of the selected optical element needs to be improved.

An object of the present invention is to provide a technique that improves alignment accuracy of an optical element.

Solution to Problem

An alignment device according to one embodiment includes a first optical element, a first holding portion, a first driving unit, a first pressure regulator, a first member, a second holding portion, a second driving unit, a second pressure regulator, and a second member. The first holding portion holds the first optical element. The first holding portion is supported in a state movable in a first direction and a second direction intersecting with the first direction. The first driving unit is driven by a pressure of a fluid. The first driving unit applies a pushing force in the first direction to the first holding portion. The first pressure regulator adjusts the pressure of the fluid supplied to the first driving unit. The first member has a first contact surface in contact with the first holding portion pushed by the first driving unit. The second holding portion holds the first member. The second holding portion is supported in a state movable in the second direction. The second driving unit is driven by a pressure of a fluid. The second driving unit applies a pushing force in the second direction to the second holding portion. The second pressure regulator adjusts the pressure of the fluid supplied to the second driving unit. The second member has a second contact surface in contact with the second holding portion pushed by the second driving unit. The first optical element has a position adjusted by a balance between the pushing force by the first driving unit and an elastomeric force in which at least one of the first holding portion and the first member elastically deforms in the first direction, and adjusted by a balance between the pushing force by the second driving unit and an elastomeric force in which at least one of the second holding portion and the second member elastically deforms in the second direction.

An alignment device according to another embodiment includes a first optical element and a second optical element, a first holding portion, a first driving unit, a first pressure regulator, a first stopper, a second stopper, and a guiding portion. The first holding portion holds the first optical element and the second optical element. The first holding portion is supported in a state linearly movable in a first direction and a second direction as a direction opposite to the first direction. The first driving unit is driven by a pressure of a fluid. The first driving unit applies a pushing force or a pulling force in the first direction to the first holding portion. The first pressure regulator adjusts the pressure of the fluid supplied to the first driving unit. The first stopper has a first contact surface in contact with the first holding portion pushed in the first direction by the first driving unit. The second stopper has a second contact surface in contact with the first holding portion pushed in the second direction by the first driving unit. The guiding portion guides a moving direction of the first holding portion. The first optical element and the second optical element have positions adjusted by a balance between the pushing force by the first driving unit and an elastomeric force in which at least one of the first holding portion and the first stopper elastically deforms or by a balance between the pulling force by the first driving unit and an elastomeric force in which at least one of the first holding portion and the second stopper elastically deforms in the first direction.

An alignment device according to another embodiment includes a first optical element, a first holding portion, a first driving unit, a first pressure regulator, and a first member. The first holding portion holds the first optical element. The first holding portion is supported in a state movable in a first direction intersecting with an optical axis of the first optical element. The first driving unit is driven by a pressure of a fluid. The first driving unit applies a pushing force in the first direction to the first holding portion. The first pressure regulator adjusts the pressure of the fluid supplied to the first driving unit. The first member has a first contact surface in contact with the first holding portion pushed by the first driving unit. The first optical element has a position adjusted by a balance between the pushing force by the first driving unit and an elastomeric force in which at least one of the first holding portion and the first member elastically deforms in the first direction.

Advantageous Effects of Invention

According to the invention disclosed in this application, alignment accuracy of the optical element can be improved.

Problems, configurations, and effects other than ones described above will be clarified in the following explanation of embodiments.

BRIEF DESCRIPTION OF DRAWINGS

FIG. 4 is a perspective view illustrating an example of a shape of a member in contact with a base portion or a stage portion illustrated in FIG. 3.

DESCRIPTION OF EMBODIMENTS

Figure 1:
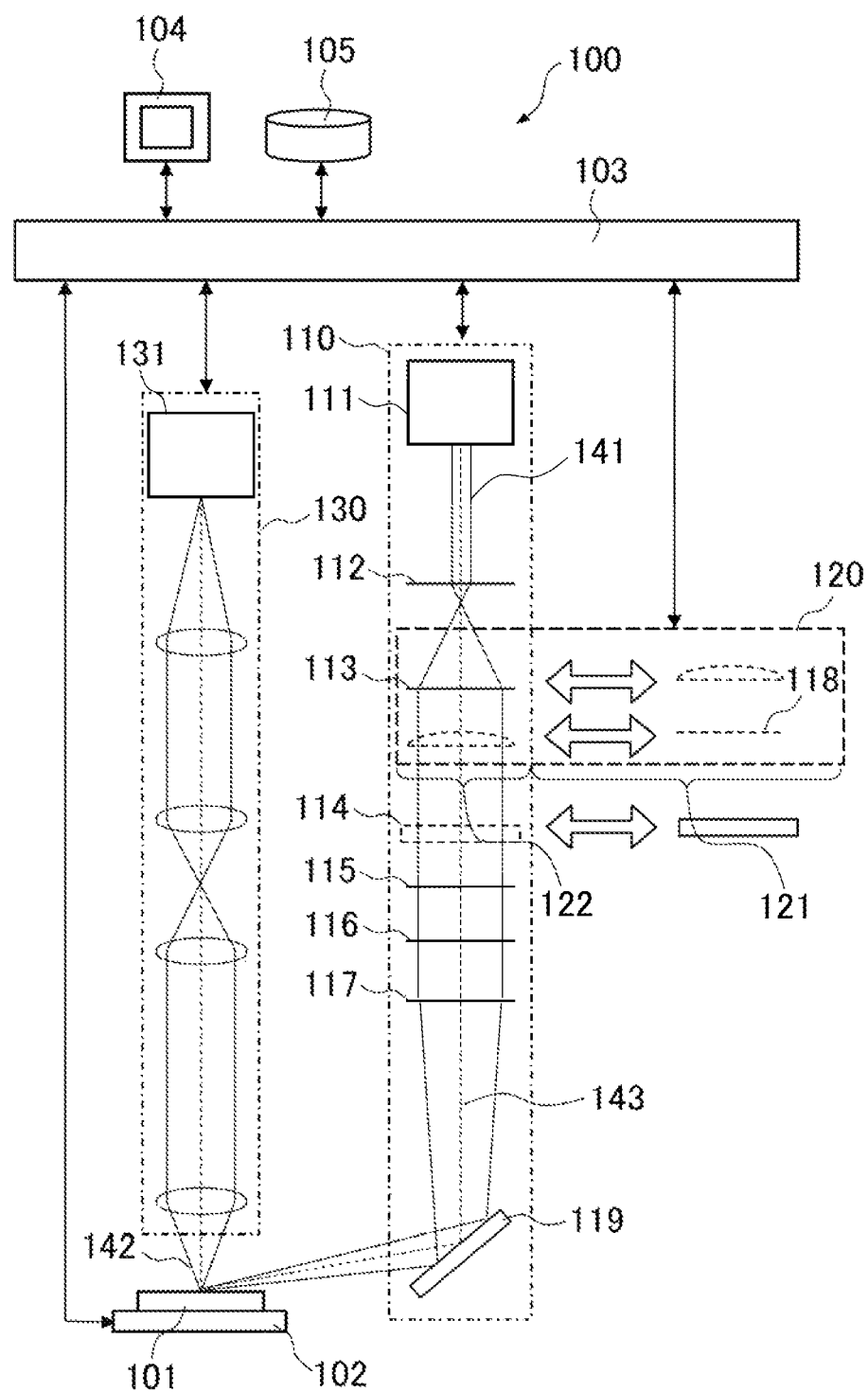
FIG. 1 is an explanatory view schematically illustrating an exemplary configuration of an optical device that includes an alignment device as one embodiment.

In the respective drawings to describe the following embodiments, an identical reference numeral is given to an identical member in principle, and repeated description thereof will be omitted. The functionally same elements are indicated by same numbers or corresponding numbers in some cases. Hereinafter, for ease of understanding of the drawings, there may be a case where hatching is given even in a plane view (front view). Although the accompanying drawings illustrate the embodiments and mounting examples according to a principle of the present disclosure, these drawings are for understanding of the present disclosure and never used for limited interpretation of the present disclosure. The descriptions of this specification are typical examples.

While in the embodiments, the description will be given in detail enough for a person skilled in the art to carry out the present disclosure, it is necessary to understand that other mountings and configurations are possible and that changes in configurations and structures and substitutions of various components can be made without departing from the scope or spirit of the technical idea of the present disclosure.

In the following description of the embodiments, the description will be given using an alignment device that aligns an optical element provided with an illumination optical system of a dark-field microscope as one example of the alignment device for optical element. However, the applied range of the alignment device for optical element is not limited to only the illumination optical system or only the dark-field microscope described later. For example, the technique described later is applicable as the alignment device for optical element provided with various kinds of optical devices, such as a bright-field microscope, a spectroscopic analyzer, an optical measuring device, an optical inspection device, or a general optical instrument and an optical device. The technique described later is also applicable to a measuring system, an inspection system (for example, a semiconductor inspection system and a defect inspection system including the dark-field microscope described later), an observation system, an analysis system, and an optical system including the optical device. Additionally, the technique described later is applicable to an alignment device as a component provided with the optical device.

Outline of Optical Device

FIG. 1 is an explanatory view schematically illustrating an exemplary configuration of an optical device that includes an alignment device of the embodiment. FIG. 1 illustrates an outline of a configuration of a dark-field microscope 100. Accordingly, there may be a case where the dark-field microscope 100 includes a component other than respective components described later. Alternatively, as a modification of the dark-field microscope 100, there is a dark-field microscope that does not include a part of the respective components described later.

The dark-field microscope (an optical device) 100 illustrated in FIG. 1 is an optical device that performs defect inspection on a wafer 101 held to a wafer stage 102. The dark-field microscope 100 includes an illumination optical system (a dark field illumination optical system) 110, an optical element driving unit (an alignment device) 120 that aligns an optical element, a computer system (a control device) 103, an input/output device 104, a storage device (a memory) 105, and a detection optical system 130.

In a manufacturing process of semiconductor devices, a fine circuit pattern is formed on the wafer 101 as a semiconductor substrate. When various kinds of defects, such as attachment of a foreign particle to the wafer 101 before the circuit pattern is formed, or attachment of a foreign particle to the circuit pattern, a short circuit between the patterns, or a disconnection of a wiring pattern in the wafer 101 on which the wiring pattern is formed (hereinafter, the above-described various kinds of defects are simply described as a "defect"), are present, this causes a decrease in reliability of the semiconductor device.

In view of this, from an aspect of the efficient manufacturing process of semiconductor devices, grasping the presence of a defect and contents of the defect in an early stage of the manufacturing process is important. For example, in a case where a defect that cannot be repaired is found in the middle of the manufacturing process of the semiconductor device, by omitting the subsequent manufacturing processes of a formation area of the device including the defect, unnecessary processes of the device area including the defect can be avoided. For example, when the cause of the defect can be identified and the cause can be eliminated, an occurrence rate of defect can be reduced.

A method for identifying the cause of the defect in a defect inspection of the wafer 101 using the dark-field microscope 100 is performed, for example, by the following procedure. First, using a defect inspection device (not illustrated), a position and a size of the defect in a circuit pattern formation surface of the wafer 101 before the circuit pattern is formed are identified. Next, based on position information of the defect identified by the above-described defect inspection device, the relevant defect is observed in detail with a Scanning Electron Microscope (a SEM) including the dark-field microscope 100 and the defect is classified. The observed defect is compared with data regarding the defect stored in a database (not illustrated), and the obtained information is used to identify the cause of the defect.

In FIG. 1, for example, the illumination optical system 110 in the dark-field microscope 100 condenses light 141 as laser light and the circuit pattern formation surface of the wafer 101 as the inspection target is irradiated with the light 141. The detection optical system 130 observes light 142 scattered by a defect, such as a foreign particle, present on the circuit pattern formation surface of the wafer 101. The light 142 is imaged on a detector 131 in the detection optical system 130. The imaged light 142 is converted into an electrical signal by the detector 131, and the electrical signal is output to the computer system 103. The computer system 103 processes a data signal transmitted from the detector 131 and displays the process result in an input/output device 104 or stores the process result in the storage device 105. There may be a case where the computer system 103 displays the process result in the input/output device 104 and stores the process result in the storage device 105. Additionally, the computer system 103 controls the respective elements of the wafer stage 102, the dark field illumination optical system 110, the optical element driving unit 120, and the detection optical system 130. In addition to the example illustrated in FIG. 1, there are various kinds of modifications of the arrangements of the optical elements of the detection optical system 130, and the arrangement is designed considering an optical design of the entire dark-field microscope 100.

The illumination optical system 110 includes a light source 111, a plano-convex lens 112, and 113, a neutral density filter 114, cylindrical lenses 115, 116, a condenser lens 117, and a mirror 119. Laser light emitted from the dark field illumination optical system 110 enters the wafer 101, for example, at 10 degrees of an elevation angle. Laser light emitted from the light source 111 is converted into parallel light with an expanded beam diameter through plano-convex lenses 112 and 113. Furthermore, the beam diameter is decreased only in an X-axis or a Y-axis direction through the cylindrical lenses 115 and 116 and the laser light is condensed at a substantially circular shape spot on the wafer 101 via the condenser lens 117. The neutral density filter 114 is used to adjust a laser power. Note that controlling an output from the light source 111 allows adjusting the power of the emitted laser light. A control signal from the computer system 103 allows a decrease in laser power through insertion of the neutral density filter 114 into the illumination optical system 110.

Here, with the dark-field microscope 100 of the embodiment, the plano-convex lens 113 is exchangeable for a plano-convex lens 118. This reason will be described. As described above, while the detection optical system 130 images the light 142 scattered on the surface of the wafer 101 for observation, the light is also scattered by roughness other than the defect on the surface of the wafer 101. In view of this, selectively attenuating the scattered light caused by roughness other than the defect is preferred. Moreover, in association with miniaturization of the circuit pattern formed on the semiconductor device, the size of the defect also shrinks, and therefore an amount of the scattered light caused by the defect decreases. In this case, identification of a noise of the scattered light caused by the roughness other than the defect from the scattered light caused by the defect becomes further difficult. Accordingly, to improve detection accuracy of the defect, increasing the amount of the scattered light caused by the defect is preferred.

A possible method to increase the amount of the scattered light caused by the defect is a method that irradiates the wafer 101 with a plurality of laser lights. The irradiation of the wafer 101 with the plurality of laser lights allows increasing the amount of light irradiated on the defect, and thus the amount of the scattered light from the defect increases as a result. However, this method requires a plurality of the illumination optical systems 110 including a plurality of the light sources 111, making the devices complicated. Since an increase in area occupied by the dark-field microscope 100 increases limitations on an installation space, and depending on the installation space of the device, this method cannot be employed in some cases.

Another method that increases the amount of the scattered light caused by the defect is possibly a method that shrinks an irradiation diameter of the irradiated light with which the wafer 101 is irradiated. The shrink in irradiation diameter increases an irradiation density, in other words, intensity of the irradiated laser light per area. Consequently, the amount of the laser light with which the defect is irradiated can be increased. However, this method narrows a detected visual field because of the decrease in irradiation diameter, this causes missing of a defect or reduction in process efficiency in association with an increase in scanning period.

Therefore, from an aspect of efficient defect inspection, the method that changes the irradiation diameter of the irradiated light with which the wafer 101 before the circuit pattern is formed is irradiated according to the size of the defect identified by the defect inspection device is effective. For example, when the circuit pattern formation surface in which a frequency of occurrence of a comparatively large-sized defect is high is observed, the irradiation diameter is increased and the processing period is shortened. On the other hand, when the circuit pattern formation surface in which a frequency of occurrence of a small-sized defect is high is observed, the irradiation diameter is decreased and the detection accuracy of the defect is prioritized. Alternatively, there is a method that, after the whole detection target area is scanned in a state where the irradiation diameter is large, the irradiation diameter is decreased relative to the area suspicious to be defective and the insertion is performed again.

As a method to change the irradiation diameter, there is a method that exchanges the optical element provided with the illumination optical system 110. For example, the dark-field microscope 100 includes the plano-convex lens 113 and the plano-convex lens 118 having mutually different focal distances. In the case of the dark-field microscope 100, the exchange is performed between the plano-convex lens 113 and the plano-convex lens 118 based on the control signal from the computer system 103. This allows changing a laser spot diameter (an irradiation diameter) without changing the center position of the laser spot of the laser (the irradiated field) with which the wafer 101 as a sample is irradiated.

The plano-convex lens 113 and the plano-convex lens 118 are held to the optical element driving unit 120. The optical element driving unit 120 includes an exchange driving unit 121 that drives so as to exchange the plurality of optical elements and an alignment unit 122 that precisely aligns the position of the exchanged optical element. The exchange between the plano-convex lens 113 and the plano-convex lens 118 is performed via the exchange driving unit 121, and the plano-convex lens 113 or the plano-convex lens 118 after the exchange is precisely aligned via the alignment unit 122. For example, when the plano-convex lens 113 is exchanged for the plano-convex lens 118, the plano-convex lens 118 is disposed at a position according to the focal distance such that the laser that has passed through the plano-convex lens 118 becomes parallel light. While FIG. 1 illustrates the example in which from the light source 111 to the condenser lens 117 are arranged in a straight line, there are various kinds of modifications of the arrangements of the plurality of optical elements. As a modification, for example, an embodiment in which a mirror is disposed between optical paths of the light 141 to fold back the optical path can be exemplified.

While the embodiment in which the exchange is performed between the plano-convex lens 113 and the plano-convex lens 118 having the mutually different focal distances to change the irradiation diameter has been described above as an example, there are various kinds of modifications of the position changes of the optical elements. For example, by changing a separation distance between lenses disposed adjacent to one another, the irradiation diameter is changed in some cases. Note that, to exchange the Neutral density filter 114 illustrated in FIG. 1 for another optical filter, a mechanism different from the optical element driving unit 120 is used for the exchange. In the embodiment of exchanging the plurality of optical elements, the number of exchanged optical elements is not limited to two. For example, there is an embodiment in which three kinds of more of lenses having mutually different focal distances are prepared and an appropriate lens is selected among the three kinds of more of the lenses according to the purpose of detection for use. There are various kinds of modifications of the elevation angle of the laser light, the number of optical elements, and a layout of the optical elements and they can be appropriately determined according to the optical design of the entire dark-field microscope.

Example of Defect Alignment Process

Figure 2:
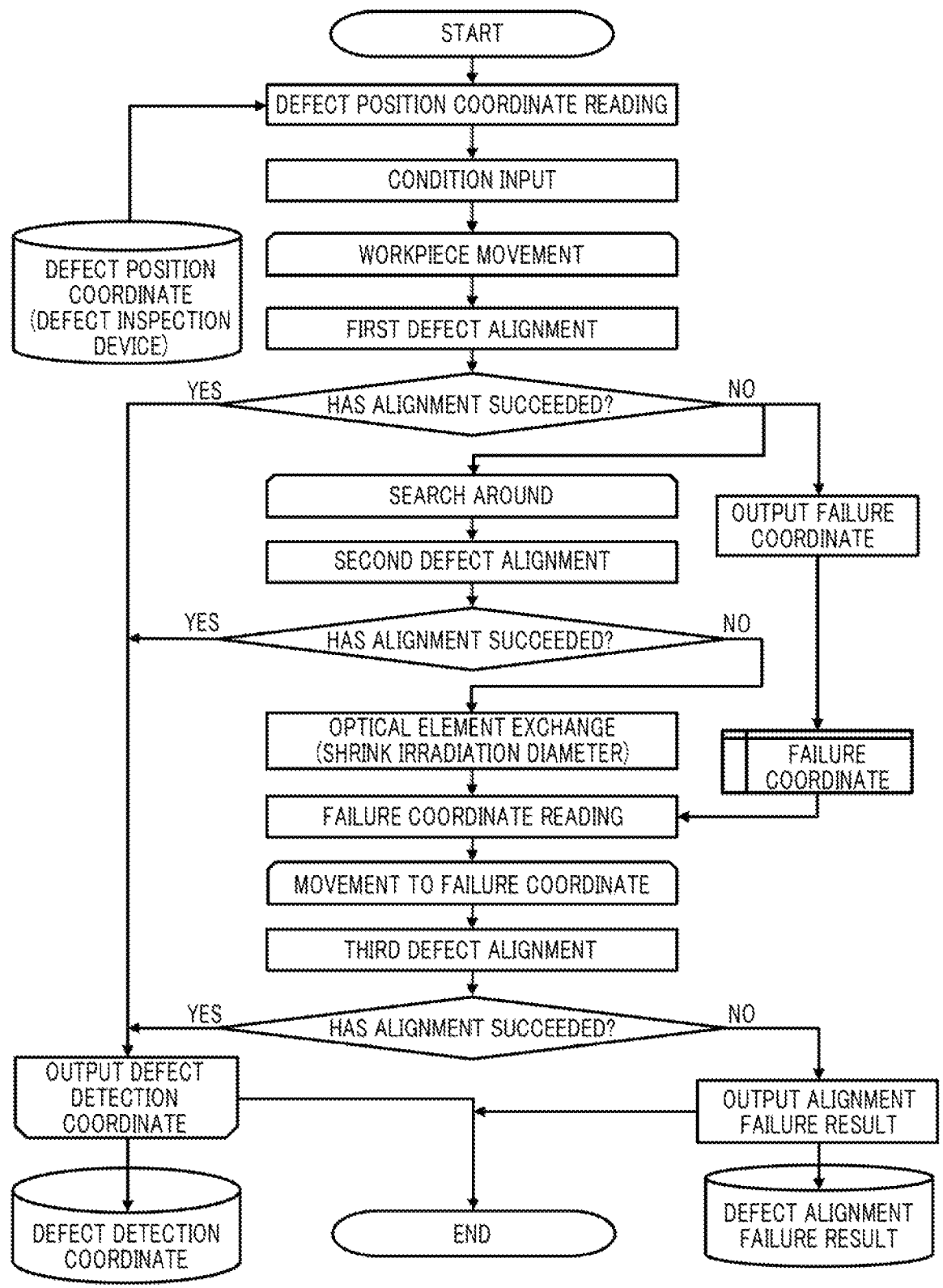
FIG. 2 is an explanatory view depicting an example of a flowchart of a defect alignment process of a semiconductor wafer using a dark-field microscope illustrated in FIG. 1.

As described above, for example, the defect inspection of the wafer 101 using the dark-field microscope 100 identifies the position of the defect in the circuit pattern formation surface of the wafer 101 using the defect inspection device (not illustrated) to observe the defect with the optical device including the dark-field microscope 100. The example of the defect alignment process that performs alignment such that the defect is positioned in the visual field of the dark-field microscope 100 based on defect position coordinate data obtained by another inspection device and identifies a coordinate where the defect is detected will be described below. FIG. 2 is an explanatory view depicting an example of a flowchart of the defect alignment process of the semiconductor wafer using the dark-field microscope illustrated in FIG. 1.

In the flowchart of the defect alignment process depicted in FIG. 2, first, as a defect position coordinate reading step, the computer system (the control device) 103 illustrated in FIG. 1 reads the defect position coordinate. The coordinate data read here is coordinate data detected by the defect inspection device different from the dark-field microscope 100. Coordinate systems differ between the defect inspection device and the dark-field microscope 100 in some cases. For example, in a case where a defect inspection device (not illustrated) uses a polar coordinate system, and the dark-field microscope 100 uses an orthogonal coordinate system, the coordinate system of the coordinate data needs to be converted. Therefore, after reading the coordinate data, a computer system 103 converts the coordinate system into the coordinate system used by the SEM system including the dark-field microscope 100.

Next, as a condition input step, an operator inputs an inspection condition for the coordinate data after the conversion process of the coordinate system is performed to the computer system 103. For example, the inspection condition includes a condition of a proportion of extraction of the defect on which the defect alignment is performed, a condition of the range of the inspection on the wafer 101, or the like. The computer system 103 controls the defect alignment based on the input inspection condition.

Next, as a workpiece movement step, the computer system 103 drives the wafer stage 102 to which the wafer 101 is held and moves the wafer 101 such that the input defect position coordinate is positioned at the visual field center of the dark-field microscope 100. The computer system 103 automatically drives the wafer stage 102.

Next, as a first defect alignment step, an image of the light 142 reflected or scattered on the wafer 101 formed on the detector 131 in the detection optical system 130 is confirmed. With the plano-convex lens 113 inserted, the computer system 103 automatically optimizes the optical condition, such as the output from a laser light source 111 and the setting of the detector 131. However, in the embodiment, since the irradiation diameter of the irradiated light with which the wafer 101 is irradiated is adjusted by exchanging the lens, first, the defect is imaged with the plano-convex lens 113 inserted.

In the first defect alignment step, the computer system 103 determines whether the defect is detected from the obtained image. In a case where the defect is detected, in other words, the alignment is successful, the computer system 103 outputs the coordinate data when the defect is detected as the data of the defect detection coordinate and the defect alignment process ends. For example, the defect detection coordinate data is stored in the storage device 105 by the computer system 103.

In a case where the defect is not detected in the first defect alignment step, in other words, the alignment fails, the defect is possibly present around the visual field. In view of this, a search around step is performed such that the peripheral part that was out of the visual field in the first defect alignment step falls within the visual field, and a second defect alignment step is performed. There may be a case where the cycle of the search around step and the second defect alignment step is repeated multiple times. In a case where the defect is detected in the second defect alignment step, in other words, the alignment is successful, the computer system 103 outputs the coordinate data when the defect is detected as the data of the defect detection coordinate and the defect alignment process ends. For example, the defect detection coordinate data is stored in the storage device 105 by the computer system 103. In a case where the alignment fails in the first defect alignment step, the computer system 103 outputs the coordinate data where the alignment failed. For example, the storage device 105 stores data of a failure coordinate.

In a case where the defect is not detected in the second defect alignment step, in other words, the alignment fails, there is a possibility that the detect cannot be defected because of the small-sized defect. Therefore, in the embodiment, as an optical element exchange step, the plano-convex lens 113 is exchange for the plano-convex lens 118 to shrink the irradiation diameter of the irradiated light with which the wafer 101 is irradiated. As described above, by shrinking the irradiation diameter of the irradiated light, the irradiation density of the light is increased, and this facilitates detection even with the small-sized defect.

After the optical element exchange step, a failure coordinate reading step that reads the coordinate where the first defect alignment step failed is performed. In this step, the computer system 103 reads the failure coordinate data stored in the storage device 105. Subsequently, as a movement step to failure coordinate, the computer system 103 moves the wafer stage 102 to which the wafer 101 held such that the read coordinate is located at the center of the visual field. Subsequently, a third defect alignment step is performed with the plano-convex lens 118 inserted. In a case where the defect is detected in the third defect alignment step, in other words, the alignment is successful, the computer system 103 outputs the coordinate data when the defect is detected as the data of the defect detection coordinate and the defect alignment process ends. For example, the defect detection coordinate data is stored in the storage device 105 by the computer system 103.

On the other hand, in a case where the third defect alignment step fails, the computer system 103 outputs the result of alignment failure. For example, the storage device 105 stores the data of the alignment failure result. Although FIG. 2 omits the depiction, in a case where the third defect alignment step fails, after the result of alignment failure is output, the search around step is performed again and defect alignment (a fourth defect alignment step (not depicted)) is performed again in some cases.

The defect alignment process ends through the above-described respective steps. The defect is minutely observed based on the defect detection coordinate data obtained by the defect alignment to analyze the cause of the defect.

Alignment Device

Figure 3:
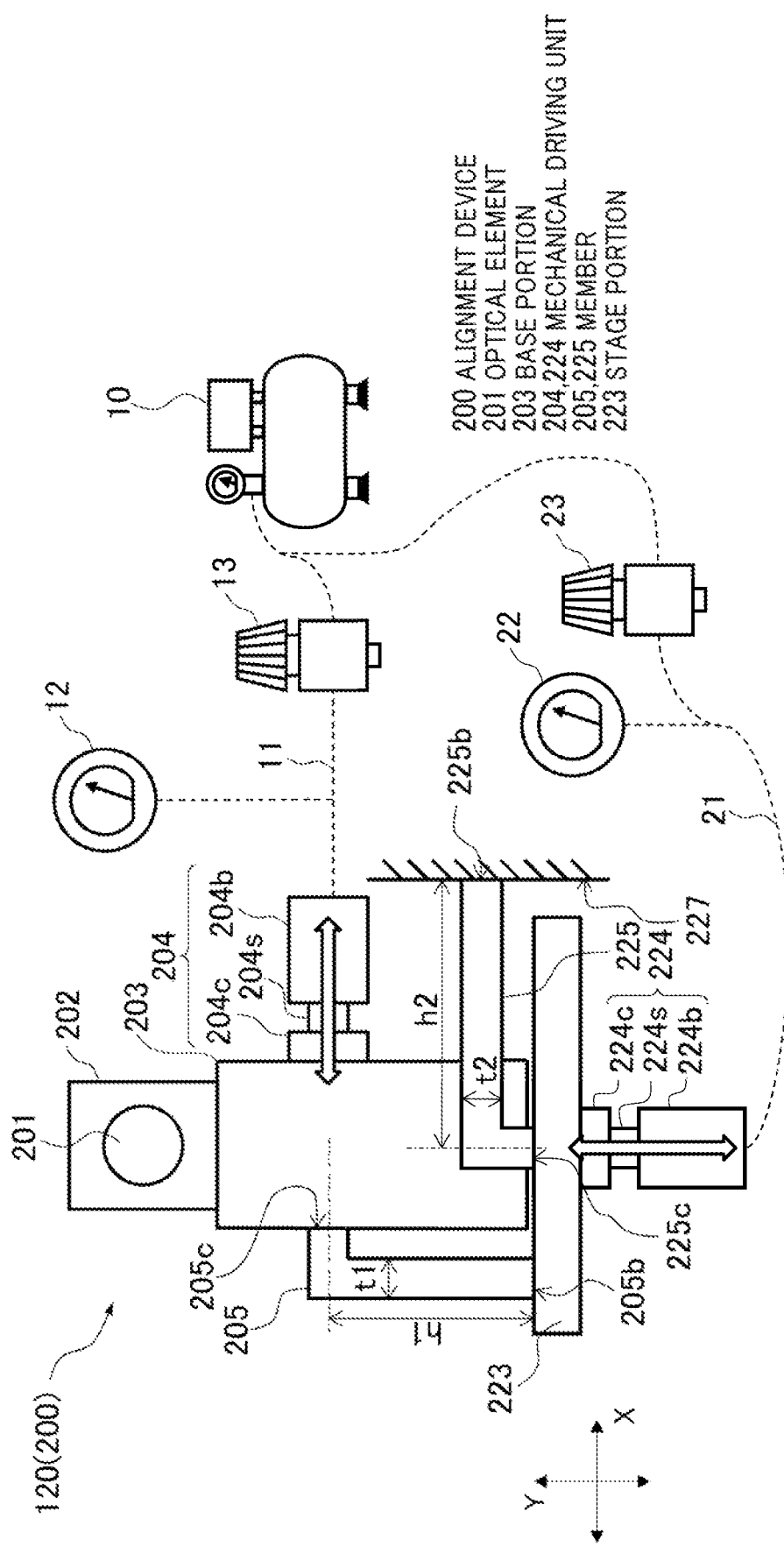
FIG. 3 is a front view illustrating an exemplary configuration of the alignment device applied to an alignment unit in an optical element driving unit illustrated in FIG. 1.

Next, an application example of the alignment device applied to the alignment unit 122 illustrated in FIG. 1 will be described. While there are various kinds of modifications of the alignment devices described below, one example will be described first using FIG. 3, and after that the representative modifications will be described. FIG. 3 is a front view illustrating an exemplary configuration of the alignment device applied to the alignment unit in the optical element driving unit illustrated in FIG. 1. FIG. 4 is a perspective view illustrating an example of a shape of a member in contact with a base portion or a stage portion illustrated in FIG. 3. An X-Y plane (a first surface as an imaginary surface) including an X-direction and a Y-direction illustrated in FIG. 3 is a surface intersecting with (for example, perpendicular to) an optical axis 143 of the light 141 illustrated in FIG. 1. While an optical element 201 illustrated in FIG. 3 corresponds to the plano-convex lens 113 or 118 illustrated in FIG. 1, FIG. 3 illustrates the optical element 201 as the general optical element 201 including a lens other than the plano-convex lens 113 or 118, a mirror, or an optical filter.

An alignment device 200 illustrated in FIG. 3 includes the optical element 201, an optical element holder 202, a base portion (a first holding portion) 203, a mechanical driving unit (a first driving unit) 204, a member (a first member) 205, a stage portion (a second holding portion) 223, a mechanical driving unit (a second driving unit) 224, and a member (a second member) 225. The alignment device 200 includes a pressure regulator (a first pressure regulator) 13 that adjusts a pressure of a fluid supplied to the mechanical driving unit 204 and a pressure regulator (a second pressure regulator) 23 that adjusts a pressure of a fluid supplied to the mechanical driving unit 224.

The base portion 203 holds the optical element 201 via the optical element holder 202. The base portion 203 is supported to an installation surface 227 in a state where the base portion 203 is movable in the X-direction intersecting with the optical axis 143 (see FIG. 1) of the light 141 (see FIG. 1) with which the optical element 201 is irradiated and the Y-direction intersecting with the X-direction. For example, in the example illustrated in FIG. 3, the base portion 203 is supported to the installation surface 227 via the member 205, the stage portion 223, and the member 225. The base portion 203 is not fixed to the stage portion 223. Although the base portion 203 is separated from the stage portion 223 to clarify that the base portion 203 is not fixed to the stage portion 223 in FIG. 3, there may be a case where the base portion 203 is in contact with the stage portion 223. In this case, since the base portion 203 can be moved along one surface of the stage portion 223, the stage portion 223 can be used as a guide. It is only necessary that the base portion 203 is not fixed to the stage portion 223. For example, there may be a case where the base portion 203 is in contact with the stage portion 223 and is supported to the stage portion 223 without via the member 205. In this case, the member 205 or the base portion 203 does not need to be fixed, and a structure in which the member 205 is in contact with the base portion 203 only in alignment may be used.

The mechanical driving unit 204 is a driving component that is driven by the pressure of the fluid supplied from a compressor (a pressure source) 10 as a power, and applies a pushing force in the X-direction to the base portion 203. As the fluid to drive the mechanical driving unit 204, for example, in addition to a gas, such as air, liquid, such as oil, is used in some cases. A pressure gauge 12 and the pressure regulator 13 are coupled to a fluid supply passage 11 to supply the mechanical driving unit 204 with the fluid. The pressure of the fluid is measured by the pressure gauge 12 and adjusted by a degree of opening of the pressure regulator 13. There may be a case where the pressure gauge 12 is not disposed between the pressure regulator 13 and the mechanical driving unit 204.

The member 205 has a contact surface (a first contact surface) 205c in contact with the base portion 203 pushed by the mechanical driving unit 204. For example, the contact surface 205c is adhesively fixed to the base portion 203. The member 205 includes a fixed surface (a first fixed portion) 205b fixed to the stage portion 223. In this case, the base portion 203 is supported to the stage portion 223 via the member 205.

The stage portion 223 holds the member 205 and is supported in a state movable in the Y-direction. The stage portion 223 is supported to the installation surface 227. For example, in the example illustrated in FIG. 3, the stage portion 223 is supported to the installation surface 227 via the member 225. The stage portion 223 is not fixed to the installation surface 227. Although the stage portion 223 is separated from the installation surface 227 to clarify that the stage portion 223 is not fixed to the installation surface 227 in FIG. 3, there may be a case where the stage portion 223 is in contact with the installation surface 227. In this case, since the stage portion 223 can be moved along the installation surface 227, the installation surface 227 can be used as a guide.

The mechanical driving unit 224 is a driving component that is driven by the pressure of the fluid supplied from the compressor (the pressure source) 10 as the power and applies a pushing force in the Y-direction to the stage portion 223. The X-direction and the Y-direction intersect with one another. In the example illustrated in FIG. 3, the X-direction is perpendicular to the Y-direction. However, there are various kinds of modifications of the angle formed by the X-direction and the Y-direction in addition to 90 degrees. The fluid that drives the mechanical driving unit 224 is similar to the fluid that drives the mechanical driving unit 204. In the example illustrated in FIG. 3, the mechanical driving units 204 and 224 share the same compressor 10, and therefore the kind of the fluid used as the power is same. A pressure gauge 22 and a pressure regulator 23 are coupled to a fluid supply passage 21 to supply the mechanical driving unit 224 with the fluid. The pressure of the fluid is measured by the pressure gauge 22 and adjusted by a degree of opening of the pressure regulator 23. There may be a case where the pressure gauge 22 is not disposed between the pressure regulator 23 and the mechanical driving unit 224.

The member 225 has a contact surface (a second contact surface) 225c in contact with the stage portion 223 pushed by the mechanical driving unit 224. For example, the contact surface 225c is adhesively fixed to the stage portion 223. The member 225 includes a fixed surface (a second fixed portion) 225b fixed to the installation surface 227. In this case, the stage portion 223 is supported to the installation surface 227 via the member 225.

The position in the X-direction of the optical element 201 is adjusted by a balance between the pushing force by the mechanical driving unit 204 and an elastomeric force in which at least one of the base portion 203 and the member 205 elastically deforms. The position in the Y-direction of the optical element 201 is adjusted by a balance between the pushing force by the mechanical driving unit 224 and an elastomeric force in which at least one of a stage portion 223 and the member 225 elastically deforms.

In the embodiment, each of the members 205 and 225 is an elastic body. In other words, the position in the X-direction of the optical element 201 is adjusted by the balance between the pushing force by the mechanical driving unit 204 and the elastomeric force in which the member 205 elastically deforms, and the position in the Y-direction of the optical element 201 is adjusted by the balance between the pushing force by the mechanical driving unit 224 and the elastomeric force in which the member 225 elastically deforms. Although the illustration is omitted, there may be a case where any one or both of the base portion 203 and the stage portion 223 is constituted of an elastic body as a modification of the embodiment. With the base portion 203 constituted of the elastic body, the member 205 is not used as the elastic body but lust a stopper member in some cases. With the stage portion 223 constituted of the elastic body, the member 225 is not used as the elastic body but just a stopper member in some cases. However, the base portion 203 needs to have a function as a member to support the optical element 201, and the stage portion 223 needs to have a function to support the optical element 201 via the member 205 and the base portion 203. With a portion the use of the member 205 and the member 225 as the elastic bodies, their shapes are easily processed so as to correspond to the required elastomeric forces. Accordingly, the members 205 and 225 are more preferably constituted of the elastic bodies.

As in the embodiment, to align the optical element 201, alignment at high accuracy is required. A method of using a highly accurately manufactured screw for alignment is used as a method for alignment. For example, there is a method that manually or automatically entwists the screw for alignment and performs alignment by a degree of the entwisting. However, when the screw is manually entwisted, the work is complicated and operation efficiency significantly decreases in a case where a frequency of the alignment is high. In the method that automatically entwists the screw and adjusts the position of the optical element holder 202, the structure of the driving component becomes complicated to finely adjust the degree of entwisting of the screw.

In the embodiment, since each of the mechanical driving units 204 and 224 uses the pressure of the fluid as the power, the large external force is applied to the base portion 203 or the stage portion 223. For example, each of the members 205 and 225 is made of the elastic body that is elastically deformable, and, for example, is made of a metallic material, such as stainless steel. In view of this, the members 205 and 225 are elastically deformed by energy elasticity caused by a change in an internal energy of the elastic body, rather than by entropy elasticity caused by a change in entropy as in an elastomer or the like. Additionally, the members 205 and 225 have thicknesses t1 and t2 that are thick in the elastic deformation directions, respectively. In view of this, even when the large external force is applied to the members 205 and 225, the degree of the elastic deformation of the members 205 and 225 is small. In other words, increasing flexural rigidity of the members 205 and 225 allows increasing a margin of the external force corresponding to the amount of elastic deformation. In view of this, by adjusting the degree of the flexural rigidity of the members 205 and 225, highly accurate alignment can be achieved without complicating the structures of the mechanical driving units 204 and 224.

As long as a material having high elasticity to the same extent of a metal, an organic compound, such as a high molecular compound, can be used as the members 205 and 225. However, in terms of increase in flexural rigidity and downsized component, the metallic material is more preferred. FIG. 4 illustrates an example of the members 205 and 225. The thickness t1, a length h1, and a depth w1 of the member 205 and the thickness t2, a length h2, and a depth w2 of the member 225 are each adjusted according to the flexural rigidity required for the members 205 and 225, the elasticity of the material constituting the members 205 and 225, and the shapes of the members 205 and 225. However, when an external force is applied by air pressure using compressed air or oil pressure, the thicknesses t1 and t2 each preferably have thicknesses to some extent. For example, with the members 205 and 225 made of stainless steel, as long as the members 205 and 225 each have the thickness of 10 mm, the length of 20 mm, and the depth of 10 mm, alignment can be performed with accuracy of 160 nm per the external force of 10 N.

In the example illustrated in FIG. 3, the mechanical driving unit 204 linearly operates in the X-direction, and the base portion 203 is disposed between the mechanical driving unit 204 and the contact surface 205c of the member 205 in the X-direction. The mechanical driving unit 224 linearly operates in the Y-direction, and the second holding portion is disposed between the mechanical driving unit 224 and the contact surface 225c of the member 225 in the Y-direction. The X-Y plane (the first surface) including the X-direction and the Y-direction intersects with an optical axis of the optical element 201. As details are schematically illustrated with the double-headed arrow given in FIG. 3, the mechanical driving unit 204 includes a contact portion 204c in contact with the base portion 203, a main body 204b fixed to an installation surface (not illustrated), and a shaft portion 204s positioned between the contact portion 204c and the main body 204b and performing a telescopic operation in the X-direction. The shaft portion 204s telescopically moves in the X-direction by the pressure of the fluid. The mechanical driving unit 224 includes a contact portion 224c in contact with the stage portion 223, a main body 224b fixed to an installation surface (not illustrated), and a shaft portion 224s positioned between the contact portion 224c and the main body 224b and performing a telescopic operation in the Y-direction. The shaft portion 224s telescopically moves in the Y-direction by the pressure of the fluid.

The alignment in the direction along the optical axis can be optically adjusted. On the other hand, the optical adjustment of the alignment in the direction intersecting with the optical axis is difficult. In view of this, as in the embodiment, the application of the mechanism that allows highly accurate alignment to the alignment in the direction intersecting with the optical axis is especially preferred.

In the example illustrated in FIG. 3, the member 205 includes the fixed surface (the first fixed portion) 205b fixed to the stage portion 223 and the contact surface 205c in contact with the base portion 203. The contact surface 205c is separated from the fixed surface 205b. Similarly, the member 225 includes the fixed surface (the second fixed portion) 225b fixed to the installation surface 227 and the contact surface 225c in contact with the stage portion 223. The contact surface 225c is separated from the fixed surface 225b. In detail, in the example illustrated in FIG. 3, the members 205 and 225 have an L shape (strictly, the member 205 has the inverted L shape and the member 225 has the L shape in the plan view illustrated in FIG. 3). Only the contact surface 205c is in contact with the base portion 203, and the other parts including the fixed surface 205b of the member 205 are separated from the base portion 203. Similarly, only the contact surface 225c is in contact with the stage portion 223, and the other parts including the fixed surface 225b of the member 225 are separated from the stage portion 223.

In the structure illustrated in FIG. 3, stress from the base portion 203 acts in the X-direction from the contact surface 205c of the member 205. Similarly, stress from the stage portion 223 acts in the Y-direction from the contact surface 225c of the member 225. At this time, since the parts other than the contact surface 205c (or 225c) are separated from the base portion 203 (or the stage portion 223), the member 205 (or 225) operates using the fixed surface 205b (or 225b) as a fulcrum and the contact surface 205c (or 225c) as a point of effort and a point of action. With the member 205, by adjusting a distance h1 and the thickness t1 of the member 205, the elasticity of the member 205 is easily controlled. The distance hi is defined as a separation distance between an imaginary line of an extension from the center of the contact surface 205c in the normal direction of the contact surface 205c and the fixed surface 205b. Similarly, with the member 225, by adjusting a distance h2 and the thickness t2 of the member 225, the elasticity of the member 225 is easily controlled. The distance h2 is defined as a separation distance between an imaginary line of an extension from the center of the contact surface 225c in the normal direction of the contact surface 225c and the fixed surface 225b.

The respective distances h1 and h2 are preferably long. Alternatively, the respective thicknesses t1 and t2 are preferably thin. Alternatively, it is preferred that the respective distances h1 and h2 are long and the respective thicknesses t1 and t2 are thin. For example, when the respective surfaces of the contact surfaces 205c and 225c are assumed to have circular shapes, the respective distances h1 and h2 are preferably longer than diameters of the respective circles. However, in a case where the respective distances h1 and h2 are long and the thicknesses t1 and t2 are thin, amounts of deformation (Δm/Pa) of the members 205 and 225 per unit input pressure increase. In view of this, when alignment at ultra-high accuracy is required, the lengths of the distances h1 and h2 are preferably not extremely long. Alternatively, the thicknesses t1 and t2 are preferably thick to some extent. Alternatively, in this case, the lengths of the distances h1 and h2 are not extremely long and the thicknesses t1 and t2 are thick are preferred.

When the respective members 205 and 225 having the shapes illustrated in FIG. 3 are made of a material, such as an elastomer, that elastically deforms by entropy elasticity, the amount of deformation relative to an external force is likely to increase. Accordingly, when the large external force is applied, from the aspect of suppressing the amount of deformation of elastic deformation, the respective members 205 and 225 are especially preferred to be made of a metallic elastic body.

Modification 1

Figure 5:
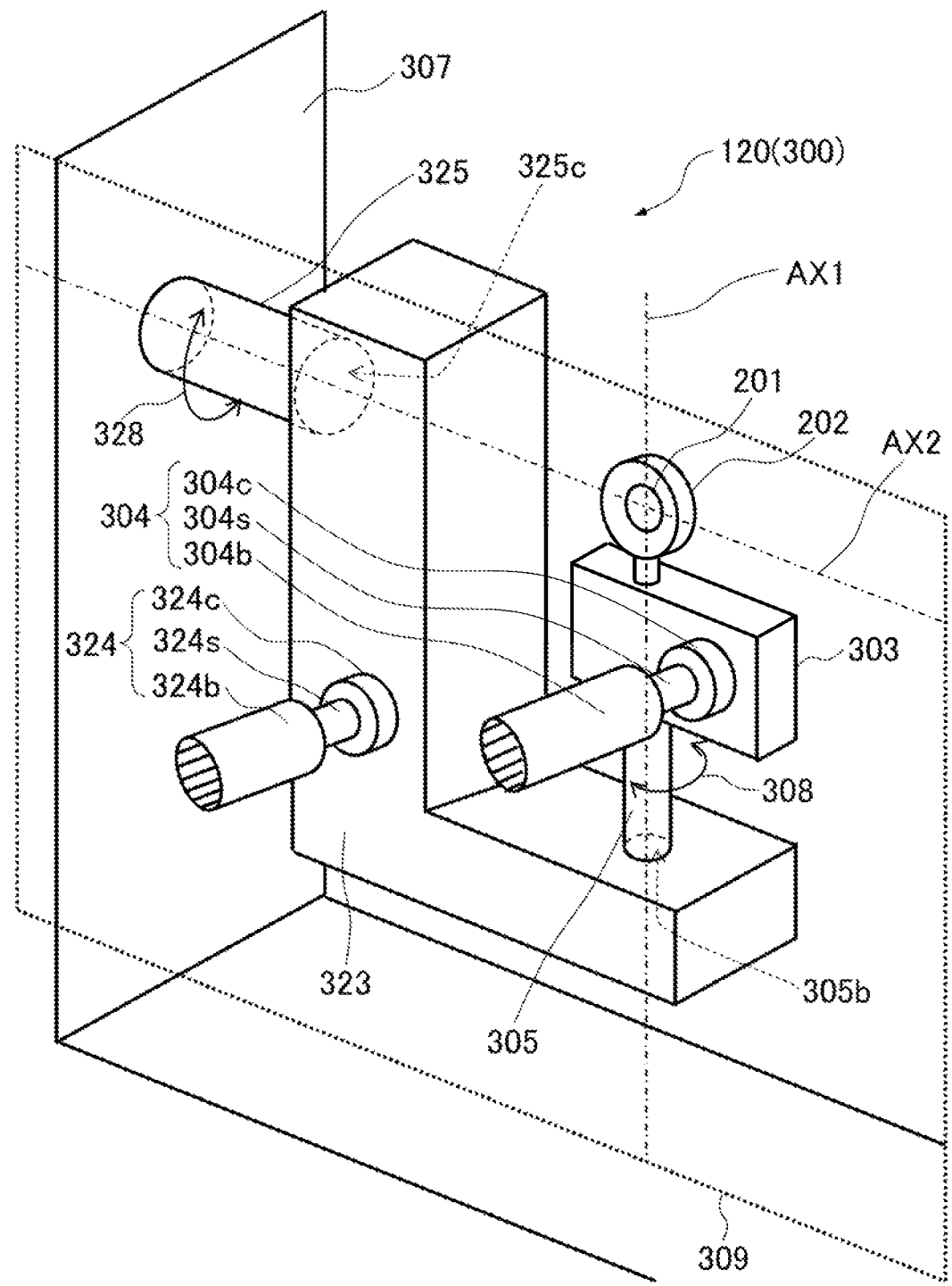
FIG. 5 is a perspective view illustrating an exemplary configuration of an alignment device of a modification of FIG. 3.

Next, the modification of the alignment device 200 illustrated in FIG. 3 will be described. FIG. 5 is a perspective view illustrating an exemplary configuration of an alignment device of a modification of FIG. 3. FIG. 5 is a front view of the optical element illustrated in FIG. 4 viewed in the optical axis direction. The following will describe an alignment device 300 illustrated in FIG. 5 about mainly points different from the alignment device 200 illustrated in FIG. 3. The alignment device 300 illustrated in FIG. 5 includes the optical element 201, the optical element holder 202, a tilting base portion (a first holding portion) 303, a mechanical driving unit (a first driving unit) 304, a member (a first member) 305, a tilting stage portion (a second holding portion) 323, a mechanical driving unit (a second driving unit) 324, and a member (a second member) 325. Although FIG. 5 omits the illustration, similarly to the alignment device 200 illustrated in FIG. 3, the alignment device 300 includes the pressure regulator (the first pressure regulator) 13 (see FIG. 3) that adjusts a pressure of a fluid supplied to the mechanical driving unit 304 and the pressure regulator (the second pressure regulator) 23 (see FIG. 3) that adjusts a pressure of a fluid supplied to the mechanical driving unit 324.

The alignment device 300 differs from the alignment device 200 illustrated in FIG. 3 in the following points. That is, the mechanical driving unit 304 performs a rotation operation in a direction 308 with an axis (a first axis) AX1 that connects the optical element 201, a tilting base portion 303, and the member 305 as a rotation axis. However, when the operating rotation angle is small, the rotation operation can be treated like a linear operation in a close tangential direction of the circumference. In the following description, the description of the "rotation operation" or "rotates" includes the case where the rotation angle is small to the extent that can be handled similarly to the linear operation, similarly to the above description. The member 305 has one end portion (a contact surface 305c illustrated in FIG. 6) fixed to the tilting base portion 303. The member 305 has the other end portion (a fixed surface 305b) fixed to the tilting stage portion 323. The member 305 is fixed in an elastically deformable state to be twisted with the axis AX1 as its rotation axis. The mechanical driving unit 324 performs a rotation operation in a direction 328 with an axis AX2 that connects the optical element 201, the tilting stage portion 323, and the member 325 as its rotation axis. The member 325 is fixed to the tilting stage portion 323 in an elastically deformable state to be twisted with the axis AX2 as its rotation axis. A surface (an imaginary surface, a second surface) 309 including the axis AX1 and the axis AX2 intersects with the optical axis of the optical element 201. The member 325 has one end portion (a contact surface 325c fixed to the tilting stage portion 323. The member 325 has the other end portion (a fixed surface 325b) fixed to an installation surface 307.

The direction 308 in FIG. 5 is a rotation direction with the axis AX1 as its rotation axis. The direction 328 is a rotation direction with the axis AX2 as its rotation axis. However, similarly to the mechanical driving units 204 and 224 described using FIG. 3, the respective mechanical driving units 304 and 324 can use driving components that linearly operate by the pressure of the fluid. In the example illustrated in FIG. 5 the respective mechanical driving units 304 and 324 linearly operate in the direction along an optical axis.

In front view, a part of the optical element 201, the tilting base portion 303, the member 305, and the tilting stage portion 323 are linearly arrayed at positions overlapping with the axis AX1. The mechanical driving unit 304 is disposed at a position overlapping with the tilting base portion 303 and not overlapping with the axis AX1 in front view. In this case, when the mechanical driving unit 304 linearly operates in the optical axis direction, the mechanical driving unit 304 rotates with the axis AX1 its rotation axis. The member 305 is made of an elastic body having flexural rigidity smaller than those of the tilting base portion 303 and the tilting stage portion 323. For example, the member 305 may be made of a metal, or as long as an excessive deformation can be suppressed, an organic material is used in some cases. An application of a pushing force from the mechanical driving unit 304 to the tilting base portion 303 elastically deforms the member 305 to be twisted in the direction 308 caused by a difference in flexural rigidity.

An amount of rotation in the direction 308 is proportionate to a torque T (a product of a load and a distance r1 from a fulcrum to a point of effort) caused by the load received from the mechanical driving unit 304 and a length L1 of the member 305, and is inversely proportional to torsional rigidity of the member 305. The length L1 of the member 305 is defined as a distance from the contact surface 305c to the fixed surface 305b illustrated in FIG. 5. The distance r1 can be defined as from the axis AX1 to a load applied point (in other words, the center of the part of the tilting base portion 303 in contact with a contact portion 304c of the mechanical driving unit 304). The distance r1 and the length L1 are values adjustable by design of the tilting base portion 303 and the member 305. The torsional rigidity of the member 305 is adjustable by the material of the member 305 and the cross-sectional shape of the member 305 in the direction perpendicular to the axis AX1. For example, increasing a diameter d1 of the member 305 to shorten the distance r1 and the length L1 and increase the torsional rigidity allows reducing the amount of rotation of the tilting base portion 303 small even when the pressure of the fluid input to the mechanical driving unit 304 is increased.

In front view, a part of the optical element 201, the tilting stage portion 323, the member 325, and the installation surface 307 are linearly arrayed at positions overlapping with the axis AX2. The mechanical driving unit 324 is disposed at a position overlapping with the tilting stage portion 323 and not overlapping with the axis AX2 in front view. In this case, when the mechanical driving unit 324 linearly operates in the optical axis direction, the mechanical driving unit 324 rotates with the axis AX2 its rotation axis. The member 325 is made of an elastic body having flexural rigidity smaller than those of the tilting base portion 303 and the tilting stage portion 323. For example, the member 325 may be made of a metal, or as long as an excessive deformation can be suppressed, an organic material is used in some cases. An application of a pushing force from the mechanical driving unit 324 to the tilting stage portion 323 elastically deforms the member 325 to be twisted in the direction 328 caused by a difference in flexural rigidity.

An amount of rotation in the direction 328 is proportionate to the torque T (a product of a load and a distance r2 from a fulcrum to a point of effort) caused by the load received from the mechanical driving unit 324 and a length L2 of the member 325, and is inversely proportional to torsional rigidity of the member 325. The length L2 of the member 325 is defined as a distance from the contact surface 325c to the fixed surface 325b illustrated in FIG. 6. The distance r2 can be defined as from the axis AX2 to a load applied point (in other words, the center of the part of the tilting stage portion 323 in contact with the contact portion 324c of the mechanical driving unit 324). The distance r2 and the length L2 are values adjustable by design of the tilting stage portion 323 and the member 325. The torsional rigidity of the member 325 is adjustable by the material of the member 325 and the cross-sectional shape of the member 325 in the direction perpendicular to the axis AX2. For example, increasing the diameter d2 of the member 325 to shorten the distance r2 and the length L2 and increase the torsional rigidity allows reducing the amount of rotation of the tilting stage portion 323 small even when the pressure of the fluid input to the mechanical driving unit 324 is increased.

In this modification, since the optical element 201 and the tilting base portion 303 perform the rotation operation in the directions 308 and 328 illustrated in FIG. 5, an inclination angle of the optical element 201 supported to the tilting base portion 303 is adjusted caused by the rotation operation. Additionally, the position of the optical element 201 in the X-Y plane can be adjusted.

Modification 2

Next, the modification of the alignment device 300 illustrated in FIG. 5 will be described. FIG. 7 is a front view illustrating an exemplary configuration of an alignment device of a modification of FIG. 3. An alignment device 400 illustrated in FIG. 7 has a configuration of a combination of the alignment device 200 illustrated in FIG. 3 and the alignment device 300 illustrated in FIG. 5. FIG. 7 omits an illustration of the detailed configuration of the parts corresponding to the alignment device 300 illustrated in FIG. 5 and the description will be given with reference to FIG. 5 and FIG. 6. In the alignment device 400 illustrated in FIG. 7, the fixed surface 325b of the member 325 illustrated in FIG. 6 is supported to a base portion 403 illustrated in FIG. 7.

Figure 6:
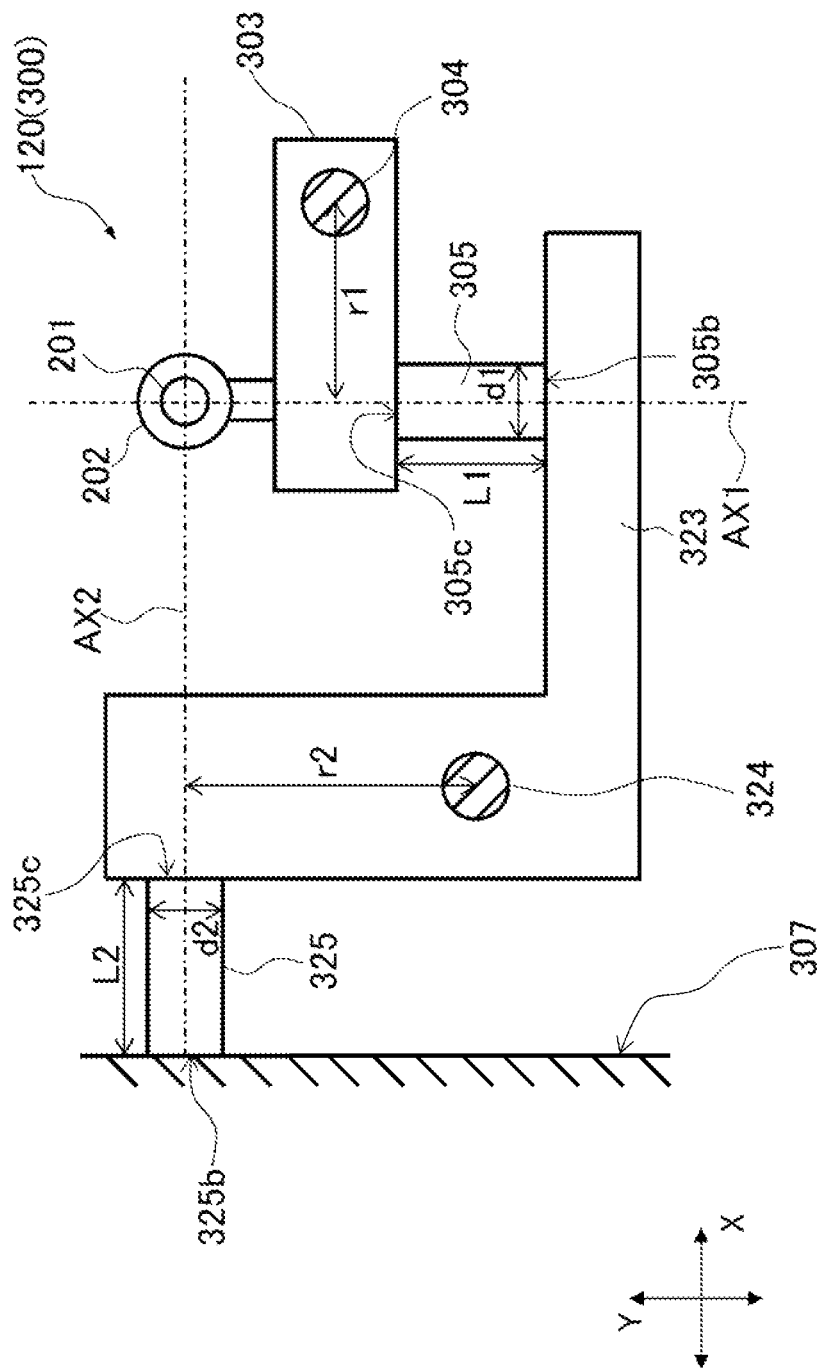
FIG. 6 is a front view of the optical element illustrated in FIG. 5 viewed in an optical axis direction.
Figure 7:
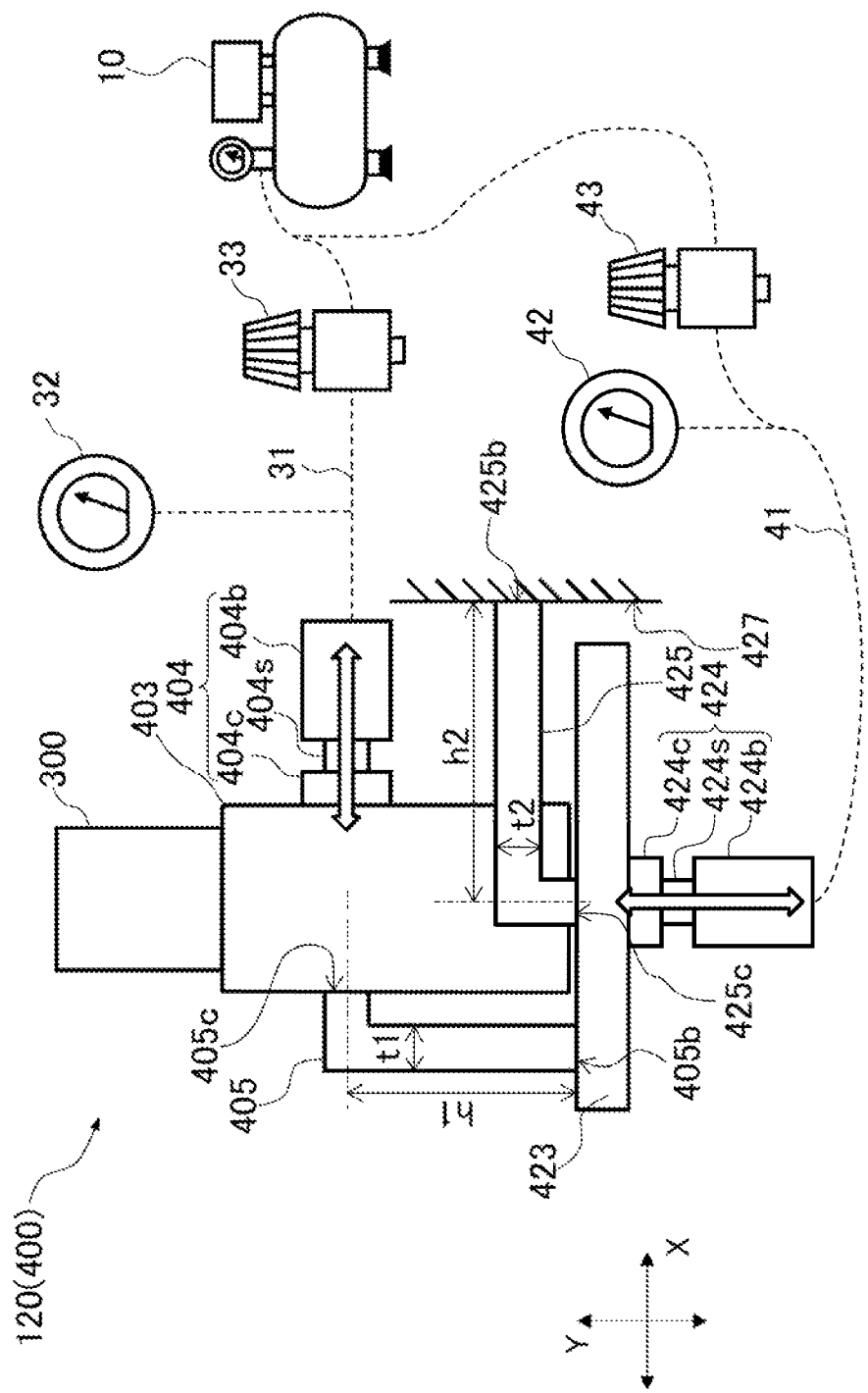
FIG. 7 is a front view illustrating an exemplary configuration of an alignment device of a modification of FIG. 5.

In addition to the configuration of the alignment device 300 described using FIG. 5 and FIG. 6, the alignment device 400 illustrated in FIG. 7 includes the base portion 403, a mechanical driving unit 404, a pressure regulator 33, and a member 405. The base portion 403 holds the tilting stage portion 323 (see FIG. 6) via the member 325 (see FIG. 6) and is supported in a state movable in the X-direction and the Y-direction intersecting with the X-direction. The mechanical driving unit 404 is driven by a pressure of a fluid and linearly applies a pushing force to the base portion 403 in the X-direction. The pressure regulator 33 adjusts the pressure of the fluid supplied to the mechanical driving unit 404. The member 405 has a contact surface 405c in contact with the base portion 403 pushed by the mechanical driving unit 404. The alignment device 400 includes a stage portion 423, a mechanical driving unit 424, a pressure regulator 43, and a member 425. The stage portion 423 holds the member 405 and is supported in a state movable in the Y-direction. The mechanical driving unit 424 is driven by a pressure of a fluid and linearly applies a pushing force to the stage portion 423 in the Y-direction. The pressure regulator 43 adjusts the pressure of the fluid supplied to the mechanical driving unit 424. The member 425 has a contact surface 425c in contact with the second holding portion pushed by the mechanical driving unit 424. In the X-direction, the base portion 403 is disposed between the mechanical driving unit 404 and the contact surface 405c of the member 405. In the Y-direction, the stage portion 423 is disposed between the mechanical driving unit 424 and the contact surface 425c of the member 425. A pressure gauge 32 and the pressure regulator 33 are coupled to a fluid supply passage 31 that supplies the mechanical driving unit 404 with the fluid. A pressure gauge 42 a and a pressure regulator 43 are coupled to the fluid supply passage 41 that supplies the mechanical driving unit 424 with the fluid. The functions of the pressure gauges 32 and 42 are similar to the pressure gauges 12 and 22 that have been described using FIG. 2.

With the alignment device 400, the position of the optical element 201 (see FIG. 5) is adjusted by the following four elements. That is, the position of the optical element 201 is adjusted by a balance between the pushing force by the mechanical driving unit 304 and the elastomeric force in which the member 305 elastically deforms in the direction 308 (see FIG. 5). The position of the optical element 201 is adjusted by a balance between the pushing force by the mechanical driving unit 324 and the elastomeric force in which the member 325 elastically deforms in the direction 328 (see FIG. 5). The position of the optical element 201 is adjusted by a balance between the pushing force by the mechanical driving unit 404 and the elastomeric force in which at least one of the base portion 403 and the member 405 elastically deforms in the X-direction. The position of the optical element 201 is adjusted by a balance between the pushing force by the mechanical driving unit 424 and the elastomeric force in which at least one of the stage portion 423 and the member 425 elastically deforms in the X-direction.

The alignment device 300 that has been described using FIG. 5 and FIG. 6 also can perform alignment in the X-Y plane illustrated in FIG. 6. However, the configuration of only the alignment device 300 mainly has a function of adjusting the inclination angle of the optical element 201. Therefore, this modification, which is obtained by combining the alignment device 200 that has been described using FIG. 3 and the alignment device 300 that has been described using FIG. 5 and FIG. 6, can achieve both of the precise alignment in the X-Y plane and the adjustment of the inclination angle of the optical element 201 at high accuracy.

The mechanical driving unit 404 illustrated in FIG. 7 is a component similar to the mechanical driving unit 204 illustrated in FIG. 3 and includes a contact portion 404c that pushes the base portion 403, a main body 404b fixed to an installation surface (not illustrated), and a shaft portion 404s positioned between the contact portion 404c and the main body 404b and performs a telescopic operation in the X-direction. The mechanical driving unit 424 illustrated in FIG. 7 is a component similar to the mechanical driving unit 224 illustrated in FIG. 3 and includes a contact portion 424c that pushes the stage portion 423, a main body 424b fixed to an installation surface (not illustrated), and a shaft portion 424s positioned between the contact portion 424c and the main body 424b and performs a telescopic operation in the Y-direction. The member 405 illustrated in FIG. 7 is a member similar to the member 205 illustrated in FIG. 3 and has the contact surface 405c and a fixed surface (a fixed portion) 405b. Similarly, the member 425 illustrated in FIG. 7 is a member similar to the member 225 illustrated in FIG. 3 and has the contact surface 425c and a fixed surface (a fixed portion) 425b fixed to an installation surface 427.

Although the illustration is omitted, as an additional modification of this modification, there is an embodiment in which the configuration of the alignment device 200 illustrated in FIG. 3 is disposed at a part of the optical element holder 202 illustrated in FIG. 5. In this case as well, the precise alignment in the X-Y plane and the adjustment of the inclination angle of the optical element 201 can be achieved. However, since the inclination angle of the part of the alignment device 200 illustrated in FIG. 3 changes in this modification (not illustrated), the work of alignment in the X-Y plane is complicated. To facilitate the alignment in the X-Y plane, the configuration of the alignment device 400 illustrated in FIG. 7 is especially preferred.

Modification 3

Figure 8:
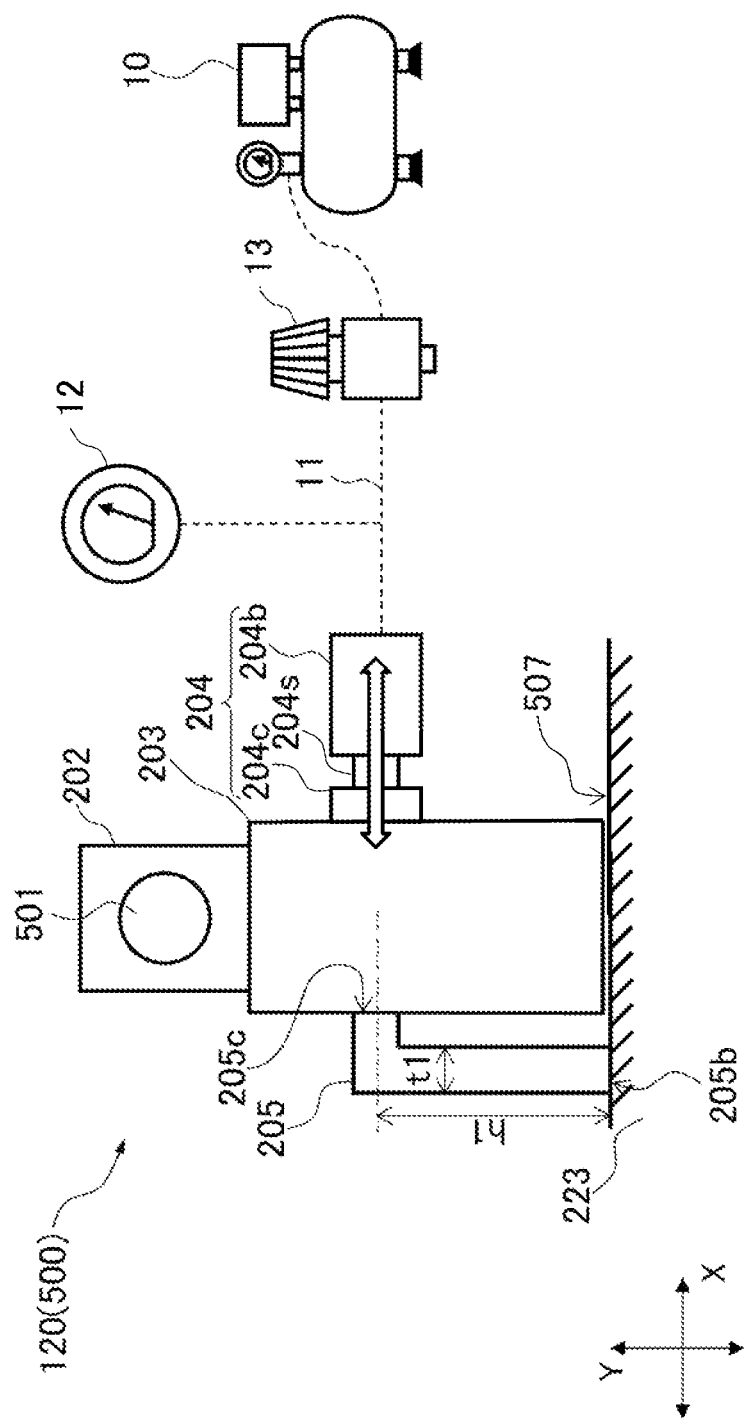
FIG. 8 is a front view illustrating an exemplary configuration of an alignment device of another modification of FIG. 3.

Next, another modification of the alignment device 200 illustrated in FIG. 3 will be described. FIG. 8 is a front view illustrating an exemplary configuration of an alignment device of another modification of FIG. 3. An alignment device 500 illustrated in FIG. 8 is an alignment device configured by the parts up to the member 205 in the alignment device 200 illustrated in FIG. 3.

Although alignment in the X-direction is required in an optical element 501 illustrated in FIG. 8, the optical element 501 has a property that does not practically affect an optical property even when the optical element 501 is slightly displaced in the Y-direction. It is only necessary to perform the alignment only in the X-direction in the optical element 501, the device like the alignment device 500 is effective.

The alignment device 500 includes the optical element 501, the base portion 203 that holds the optical element 501 and is supported in a state movable in the X-direction intersecting with an optical axis of the optical element 501, the mechanical driving unit 204 that is driven by a pressure of a fluid and applies a pushing force to the base portion 203 in the X-direction, the pressure regulator 13 that adjusts the pressure of the fluid supplied to the mechanical driving unit 204, and the member 205 having the contact surface 205c in contact with the base portion 203 pushed by the mechanical driving unit 204. The position in the X-direction of the optical element 501 is adjusted by a balance between the pushing force by the mechanical driving unit 204 and an elastomeric force in which at least one of the base portion 203 and the member 205 elastically deforms. Since the alignment in the Y-direction is not performed in this modification, in the alignment device 200 illustrated in FIG. 3, components used for the alignment in the Y-direction are removed, and the member 205 is fixed to an installation surface 507. In this case, the device can be downsized compared with the alignment device 200 illustrated in FIG. 3.

As another modification of this modification, the optical element 501, the optical element holder 202 that holds the optical element 501, and the tilting base portion 303 and the member 305 illustrated in FIG. 5 and FIG. 6 may be disposed at the part of the optical element holder 202 illustrated in FIG. 8 In an alignment device of this modification, the mechanical driving unit 304 (see FIG. 5) performs a rotation operation in the direction 308 (see FIG. 5) with the axis AX1 (see FIG. 5) that connects the optical element 501, the first holding portion, and the member 305

(see FIG. 5) as its rotation axis. The member 305 has one end portion (the contact surface 305c illustrated in FIG. 6) fixed to the tilting base portion 303 and the other end portion (the fixed surface 305b illustrated in FIG. 6) fixed to the base portion 203 illustrated in FIG. 8, and is fixed in an elastically deformable state to be twisted with the axis AX1 (see FIG. 5) as its rotation axis. The mechanical driving unit 204 linearly operates in the X-direction. In the X-direction, a base portion 203 is disposed between the mechanical driving unit 204 and the contact surface 205c of the member 205. The surface (the surface 309 including the axis AX1 illustrated in FIG. 5 and the X-direction illustrated in FIG. 6) including the axis AX1 and the X-direction intersecting with the axis AX1 intersects with the optical axis of the optical element 501. This modification allows the alignment in the X-direction and the adjustment of the inclination angle of the optical element 501 with the axis AX1 as its rotation axis.

Modification 4

Figure 9:
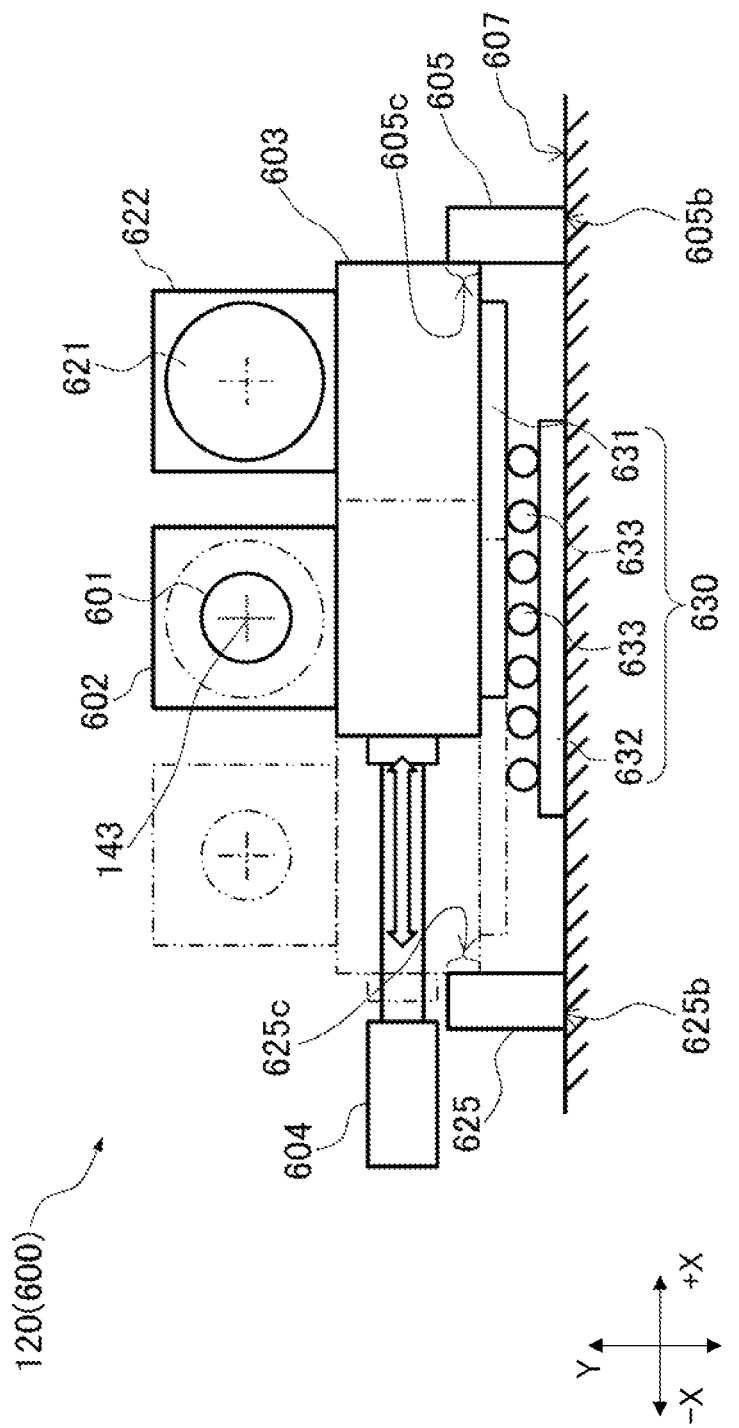
FIG. 9 is a front view illustrating a modification of the alignment devices illustrated in FIG. 3 to FIG. 8.
Figure 10:
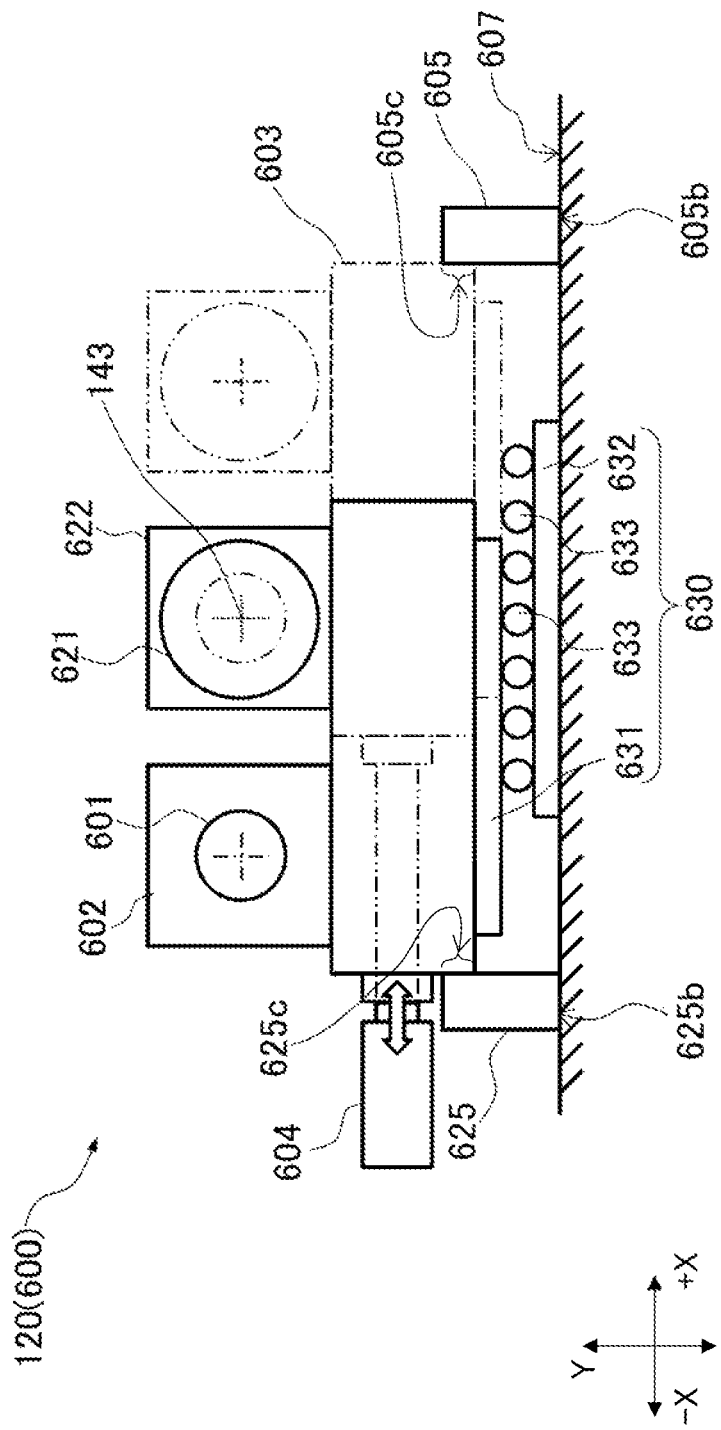
FIG. 10 is a front view illustrating a state in which an optical lens is switched from the state illustrated in FIG. 9 and alignment is performed.

Next, an embodiment in which one device performs the switching operation and the alignment of the optical element will be described. FIG. 9 is a front view illustrating a modification of the alignment devices illustrated in FIG. 3 to FIG. 8. FIG. 10 is a front view illustrating a state in which an optical lens is switched and alignment is performed from the state illustrated in FIG. 9. The X-Y plane illustrated in FIG. 9 and FIG. 10 intersects with the optical axes 143 of optical elements 601 and 621. Although FIG. 9 and FIG. 10 omit the illustration, a mechanical driving unit 604 is a driving component that is driven by a pressure of a fluid similarly to the mechanical driving unit 204 illustrated in FIG. 3. Accordingly, to the mechanical driving unit 604, the fluid supply passage 11 (see FIG. 3) that supplies the mechanical driving unit 604 with the fluid is coupled. Similarly to FIG. 3, to the fluid supply passage 11, the compressor 10, the pressure gauge 12, and the pressure regulator 13 are coupled. The pressure regulator 13 adjusts the pressure of the fluid supplied to the mechanical driving unit 604.

An alignment device 600 illustrated in FIG. 9 and FIG. 10 includes the optical elements 601 and 621 having mutually different optical properties. The alignment device 600 includes a base portion 603 that holds the optical element 601 and the optical element 621 and is supported in a state linearly movable in a +X-direction and a −X-direction, a direction opposite to the +X-direction, and the mechanical driving unit 604 that is driven by a pressure of a fluid and applies a pushing force or a pulling force in the +X-direction to the base portion 603. The alignment device 600 includes a stopper 605 having a contact surface 605c in contact with the base portion 603 pushed in the +X-direction by the mechanical driving unit 604, a stopper 625 having a contact surface 625c in contact with the base portion 603 pushed in the −X-direction by the mechanical driving unit 604, and a guiding portion 630 that guides the moving direction of the base portion 603.

The positions of the optical element 601 and the optical element 621 in the +X-direction are adjusted by a balance between the pushing force by the mechanical driving unit 604 and the elastomeric force in which at least one of the base portion 603 and the stopper 605 elastically deforms, or a balance between the pulling force by the mechanical driving unit 604 and an elastomeric force in which at least one of the base portion 603 and the stopper 625 elastically deforms.

The optical element 601 is housed in an optical element holder 602, and the optical element 621 is housed in an optical element holder 622. The respective optical element holders 602 and 622 are fixed to the base portion 603. While the positions of the optical elements 601 and 621 move in the +X-direction, a distance from the optical axis 143 of each optical element to an installation surface 607 as a reference surface is constant (Note that the constant includes an error in a level acceptable in terms of optical design).

The guiding portion 630 includes a slider 631 that fixes and holds the base portion 603, a roller base 632 fixed to the installation surface 607, and a plurality of rollers (rotators) 633 that are disposed between the slider 631 and the roller base 632 and guide the operation of the slider 631 in the +X-direction through rotation. The stopper (the member, the elastic body)605 and the stopper (the member) 625 include fixed surfaces (fixed portions, elastic bodies) 605b and 625b fixed to the installation surface 607. The guiding portion 630, in detail, the roller base 632 of the guiding portion 630, is fixed to the installation surface 607 as the reference surface.

In the examples illustrated in FIG. 9 and FIG. 10, applying the pushing force or the pulling force by the mechanical driving unit 604 to the base portion 603 linearly moves the slider 631 in the +X-direction together with the base portion 603. For example, the example illustrated in FIG. 9 illustrates a state in which the pushing force is applied from the mechanical driving unit 604. In this case, a part of the base portion 603 is in contact with the contact surface 605c of the stopper 605 and the operation of the base portion 603 stops at a position where a reactive force from the stopper 605 is balanced with the pushing force by the mechanical driving unit 604. At this time, in front view, the optical element 601 is disposed at the center of the movable range and is disposed at the position where the light 141 (see FIG. 1) is irradiated. For example, the stopper 605 is made of a metallic elastic body similarly to the member 205 illustrated in FIG. 3. Accordingly, the alignment device 600 can dispose the optical element 601 at a predetermined position and precisely align the optical element 601 in the +X-direction.

For example, the example illustrated in FIG. 10 illustrates a state in which the pulling force is applied by the mechanical driving unit 604. In this case, a part of the base portion 603 is in contact with the contact surface 625c of the stopper 625 and the operation of the base portion 603 stops at a position where a reactive force from the stopper 625 is balanced with the pulling force by the mechanical driving unit 604. At this time, in front view, the optical element 621 is disposed at the center of the movable range and is disposed at the position where the light 141 (see FIG. 1) is irradiated. For example, the stopper 625 is made of a metallic elastic body similarly to the member 205 illustrated in FIG. 3. Accordingly, the alignment device 600 can dispose the optical element 621 at a predetermined position and precisely align the optical element 621 in the +X-direction.

Thus, this modification allows achieving the switching of the optical element and the precise alignment by one device. Since the switching of the optical element and the alignment significantly differ in the range of required operations, achieving both by one device is difficult. However, in this modification, even when a large pressure using a fluid is used as a driving power, the precise alignment can be performed. Consequently, this modification allows performing the switching of the optical element and the precise alignment by one device, and the entire device can be downsized.

Similar to the case of the alignment device 200 that has been described using FIG. 3, there is the modification that uses the base portion 603 as the elastic body. However, from an aspect of ease of control of the adjustment of the position, it is preferred that the base portion 603 is not configured as the elastic body but the stoppers 605 and 625 are configured as the elastic bodies. That is, in the example illustrated in FIG. 9 and FIG. 10, the position of the optical element 601 is adjusted by the balance between the pushing force by the mechanical driving unit 604 and the elastomeric force in which the stopper 605 elastically deforms in the +X-direction. The position of the optical element 621 in the +X-direction is adjusted by the balance between the pulling force by the mechanical driving unit 604 and the elastomeric force in which the stopper 625 elastically deforms.

Additionally, the contact surface 605c is separated from a fixed surface 605b and the contact surface 625c is separated from the fixed surface 605b. This allows separating a distance between the fulcrum and the point of action and a distance between the fulcrum and the point of effort in a dynamical system between base portion 603, the stopper 605 or 625, and the installation surface 607.

As described above, the stopper 605 and the stopper 625 are made of the metallic elastic bodies. As another modification of this modification, there may be a case where the stopper 605 and the stopper 625 are made of, for example, an organic material. However, from an aspect of lowering the degree of elastic deformation, it is preferred that the stoppers 605 and 625 are each made of a metal and have a thickness similar to the thickness t1 illustrated in FIG. 3. As in this modification, in the case where the stopper 605 or 625 or the base portion 603 is not fixed and the stoppers 605 and 625 and the base portion 603 are repeatedly in contact, they are especially preferably made of a material having a high wear resistance, for example, stainless steel or the like.

While this modification has been described with the example in which the guiding portion 630 is fixed to the installation surface 607 for simplification of the description, various kinds of modifications are applicable. For example, there are a modification of a combination of the alignment device 200 used in FIG. 3 and this modification, and a modification of exchanging the installation surface 607 illustrated in FIG. 9 and FIG. 10 for the stage portion 223 illustrated in FIG. 3. In this case, the alignment can be performed in the X-direction and the Y-direction.

For example, in a case where the parts of the optical element holders 602 and 622 of this modification are exchanged for the configurations of the alignment device 300 that has been described using FIG. 5 and FIG. 6, the respective inclination angles of the optical elements 601 and 621 illustrated in FIG. 9 can be controlled. While FIG. 9 and FIG. 10 have described the method of switching the optical element by the linear operation, as a modification, there may be a case where the optical element is switched by the rotation operation.

While various kinds of the modifications have been described above, the appropriate combination of the respective modifications is applicable.

While the representative modifications of the embodiments have been described above, the present invention is not limited to the above-described embodiments or the above-described representative modifications, and various kinds of modifications are applicable in the scope without departing from the gist of the present invention.

INDUSTRIAL APPLICABILITY

The present invention is usable for an optical device.

List of Reference Signs 10 compressor (pressure source)
11, 21, 31, 41 fluid supply passage
12, 22, 32, 42 pressure gauge
13, 23, 33, 43 pressure regulator
100 dark-field microscope (optical device)
101 wafer (sample)
102 wafer stage
103 computer system (control unit)
104 input/output device
105 storage device (memory)
110 dark field illumination optical system
111 light source
111 laser light source
112, 113, 118 plano-convex lens
114 Neutral density filter
115, 116 cylindrical lens
117 condenser lens
119 mirror
120 optical element driving unit (alignment device)
121 exchange driving unit
122 alignment unit
130 detection optical system
131 detector
141 light
143 optical axis
200, 300, 400, 500, 600 alignment device
201, 501, 601, 621 optical element
202, 602, 622 optical element holder
203, 403, 603 base portion (holding portion)
204, 224, 304, 324, 404, 424, 604 mechanical driving unit (driving unit)
204b, 224b, 304b, 324b, 404b, 424b main body
204c, 224c, 304c, 324c, 404c, 424c contact portion
204s, 224s, 304s, 324s, 404s, 424s shaft portion
205, 225, 305, 325, 405, 425 member
205b, 225b, 305b, 325b, 405b, 425b, 605b, 625b fixed surface (fixed portion)
205c, 225c, 305c, 325c, 405c, 425c, 605c, 625c contact surface
223, 423 stage portion (holding portion)
227, 307, 427, 507, 607 installation surface
303 tilting base portion (holding portion)
308, 328 direction
309 surface (imaginary surface)
323 tilting stage portion (holding portion)
605, 625 stopper (member, elastic body)
630 guiding portion
631 slider
632 roller base
633 roller (rotator)
AX1, AX2 axis (rotation axis)
d1, d2 diameter
h1, h2, r1, r2 distance
L1, L2 length
t1, t2 thickness

The invention claimed is:
1. An alignment device comprising:
a first optical element;
a first holding portion that holds the first optical element, the first holding portion being supported in a state movable in a first direction and a second direction intersecting with the first direction;
a first driving unit driven by a pressure of a fluid, the first driving unit applying a pushing force in the first direction to the first holding portion;
a first pressure regulator that adjusts the pressure of the fluid supplied to the first driving unit;
a first member having a first contact surface in contact with the first holding portion pushed by the first driving unit;
a second holding portion that holds the first member, the second holding portion being supported in a state movable in the second direction;
a second driving unit driven by a pressure of a fluid, the second driving unit applying a pushing force in the second direction to the second holding portion;
a second pressure regulator that adjusts the pressure of the fluid supplied to the second driving unit; and
a second member having a second contact surface in contact with the second holding portion pushed by the second driving unit, wherein
the first optical element has a position:
   adjusted by a balance between the pushing force by the first driving unit and an elastomeric force in which at least one of the first holding portion and the first member elastically deforms in the first direction; and
   adjusted by a balance between the pushing force by the second driving unit and an elastomeric force in which at least one of the second holding portion and the second member elastically deforms in the second direction.

2. The alignment device according to claim 1, wherein the first driving unit linearly operates in the first direction,
in the first direction, the first holding portion is disposed between the first driving unit and the first contact surface of the first member,
the second driving unit linearly operates in the second direction,
in the second direction, the second holding portion is disposed between the second driving unit and the second contact surface of the second member, and
a first surface including the first direction and the second direction intersects with an optical axis of the first optical element.

3. The alignment device according to claim 1, wherein
the first driving unit performs a rotation operation in the first direction with a first axis connecting the first optical element, the first holding portion, and the first member as a rotation axis,
the first member has one end portion fixed to the first holding portion and the other end portion fixed to the second holding portion, and the first member is fixed in an elastically deformable state to be twisted with the first axis as a rotation axis,
the second driving unit performs a rotation operation in the second direction with a second axis connecting the first optical element, the second holding portion, and the second member as a rotation axis,
the second member is fixed to the second holding portion in an elastically deformable state to be twisted with the second axis as a rotation axis, and
a second surface including the first axis and the second axis intersects with an optical axis of the first optical element.

4. The alignment device according to claim 3, further comprising:

a third holding portion that holds the second holding portion via the second member, the third holding portion being supported in a state movable in a third direction and a fourth direction intersecting with the third direction;
a third driving unit driven by a pressure of a fluid, the third driving unit linearly applying a pushing force in the third direction to the third holding portion;
a third pressure regulator that adjusts the pressure of the fluid supplied to the third driving unit;
a third member having a third contact surface in contact with the third holding portion pushed by the third driving unit;
a fourth holding portion that holds the third member, the fourth holding portion being supported in a state movable in the fourth direction;
a fourth driving unit driven by a pressure of a fluid, the fourth driving unit linearly applying a pushing force in the fourth direction to the fourth holding portion;
a fourth pressure regulator that adjusts the pressure of the fluid supplied to the fourth driving unit; and
a fourth member having a fourth contact surface in contact with the fourth holding portion pushed by the fourth driving unit, wherein
in the third direction, the third holding portion is disposed between the third driving unit and the third contact surface of the third member,
in the fourth direction, the fourth holding portion is disposed between the fourth driving unit and the fourth contact surface of the fourth member,
the first optical element has the position:
   adjusted by a balance between the pushing force by the first driving unit and an elastomeric force in which the first member elastically deforms in the first direction;
   adjusted by a balance between the pushing force by the second driving unit and an elastomeric force in which the second member elastically deforms in the second direction;
   adjusted by a balance between the pushing force by the third driving unit and an elastomeric force in which at least one of the third holding portion and the third member elastically deforms in the third direction; and
   adjusted by a balance between the pushing force by the fourth driving unit and an elastomeric force in which at least one of the fourth holding portion and the fourth member elastically deforms in the fourth direction.

5. The alignment device according to claim 1, wherein
the first driving unit performs a rotation operation in the first direction with a first axis connecting the first optical element, the first holding portion, and the first member as a rotation axis,
the first member has one end portion fixed to the first holding portion and the other end portion fixed to the second holding portion, and the first member is fixed in an elastically deformable state to be twisted with the first axis as a rotation axis,
the second driving unit linearly operates in the second direction,
in the second direction, the second holding portion is disposed between the second driving unit and the second contact surface of the second member, and
a third surface including the first axis and the second direction intersecting with the first axis intersects with an optical axis of the first optical element.

6. The alignment device according to claim 1, wherein the first optical element has the position:
  adjusted by a balance between the pushing force by the first driving unit and an elastomeric force in which the first member elastically deforms in the first direction; and
  adjusted by a balance between the pushing force by the second driving unit and an elastomeric force in which the second member elastically deforms in the second direction.

7. The alignment device according to claim 6, wherein the first member includes a first fixed portion fixed to the second holding portion, and
the first contact surface is separated from the first fixed portion.

8. The alignment device according to claim 7, wherein the first member is made of a metallic elastic body.

9. An optical device comprising:
the alignment device according to claim 1, and
an optical system that irradiates the first optical element with light.

10. An alignment device comprising:
a first optical element and a second optical element;
a first holding portion that holds the first optical element and the second optical element, the first holding portion being supported in a state linearly movable in a first direction and a second direction as a direction opposite to the first direction;
a first driving unit driven by a pressure of a fluid, the first driving unit applying a pushing force or a pulling force in the first direction to the first holding portion;
a first pressure regulator that adjusts the pressure of the fluid supplied to the first driving unit;
a first stopper having a first contact surface in contact with the first holding portion pushed in the first direction by the first driving unit;
a second stopper having a second contact surface in contact with the first holding portion pushed in the second direction by the first driving unit; and
a guiding portion that guides a moving direction of the first holding portion, wherein
the first optical element and the second optical element have positions:
  adjusted by a balance between the pushing force by the first driving unit and an elastomeric force in which at least one of the first holding portion and the first stopper elastically deforms or by a balance between the pulling force by the first driving unit and an elastomeric force in which at least one of the first holding portion and the second stopper elastically deforms in the first direction.

11. The alignment device according to claim 10, wherein the first optical element and the second optical element have the positions:
  adjusted by a balance between the pushing force by the first driving unit and an elastomeric force in which the first stopper elastically deforms in the first direction; and
  adjusted by a balance between the pulling force by the first driving unit and an elastomeric force in which the second stopper elastically deforms in the first direction.

12. The alignment device according to claim 11, wherein the first stopper includes a first fixed portion fixed to an installation surface supported to a chassis,
the second stopper includes a second fixed portion fixed to the installation surface supported to the chassis, and
the first contact surface is separated from the first fixed portion, and the second contact surface is separated from the second fixed portion.

13. The alignment device according to claim 12, wherein the first stopper and the second stopper are made of a metallic elastic body.

14. An optical device comprising:
the alignment device according to claim 10, and
an optical system that irradiates the first optical element or the second optical element with light.

15. An alignment device comprising:
a first optical element;
a first holding portion that holds the first optical element, the first holding portion being supported in a state movable in a first direction intersecting with an optical axis of the first optical element;
a first driving unit driven by a pressure of a fluid, the first driving unit applying a pushing force in the first direction to the first holding portion;
a first pressure regulator that adjusts the pressure of the fluid supplied to the first driving unit; and
a first member having a first contact surface in contact with the first holding portion pushed by the first driving unit, wherein
the first optical element has a position:
  adjusted by a balance between the pushing force by the first driving unit and an elastomeric force in which at least one of the first holding portion and the first member elastically deforms in the first direction.

* * * * *